United States Patent
Henderson et al.

(10) Patent No.: US 10,019,218 B2
(45) Date of Patent: Jul. 10, 2018

(54) MULTI-DISPLAY POWER-UP ANIMATION SYSTEMS AND METHODS

(71) Applicant: EDAN INSTRUMENTS, INC., Shenzhen (CN)

(72) Inventors: Richard Henderson, Sunnyvale, CA (US); Sean Murphy, Sunnyvale, CA (US)

(73) Assignee: EDAN INSTRUMENTS, INC., Shenzhen (CN)

( * ) Notice: Subject to any disclaimer, the term of this patent is extended or adjusted under 35 U.S.C. 154(b) by 288 days.

(21) Appl. No.: 14/825,939

(22) Filed: Aug. 13, 2015

(65) Prior Publication Data

US 2016/0048365 A1 Feb. 18, 2016

Related U.S. Application Data

(60) Provisional application No. 62/037,523, filed on Aug. 14, 2014.

(51) Int. Cl.
*G06F 3/14* (2006.01)
*G06F 3/147* (2006.01)
(Continued)

(52) U.S. Cl.
CPC .......... *G06F 3/1423* (2013.01); *G06F 1/1692* (2013.01); *G06F 3/147* (2013.01);
(Continued)

(58) Field of Classification Search
None
See application file for complete search history.

(56) References Cited

U.S. PATENT DOCUMENTS

| 5,596,261 A | 1/1997 | Suyama |
| 6,067,224 A | 5/2000 | Nobuchi |

(Continued)

FOREIGN PATENT DOCUMENTS

CN 105877781 8/2016

OTHER PUBLICATIONS

Notice of Allowance issued in related U.S. Appl. No. 14/825,984, dated Dec. 9, 2016.
(Continued)

*Primary Examiner* — Michelle Chin
(74) *Attorney, Agent, or Firm* — Gilberto M. Villacorta; Brett P. Belden; Foley & Lardner LLP

(57) ABSTRACT

A portable computing device includes a user interface system including at least a first display and a second display, a memory storing a series of images, a user input device configured to receive an input from a user corresponding to changing a power state of the portable computing device, and a processing circuit coupled to the user interface system, the memory, and the user input device. The processing circuit is configured to receive the input from the user corresponding to changing the power state, determine based on the received input if the input satisfies a trigger condition, and in response to determining that the trigger condition is satisfied, display the series of images on the first display and the second display such that at least one image is displayed on the first display and the second display during a display sequence.

20 Claims, 20 Drawing Sheets

(51) Int. Cl.
    *G06T 13/80*    (2011.01)
    *G09G 5/14*    (2006.01)
    *G09G 5/395*    (2006.01)
    *G06F 1/16*    (2006.01)

(52) U.S. Cl.
    CPC .............. *G06T 13/80* (2013.01); *G09G 5/14* (2013.01); *G09G 5/395* (2013.01)

(56) References Cited

U.S. PATENT DOCUMENTS

| | | |
|---|---|---|
| 6,471,651 B1 | 10/2002 | Hwang et al. |
| 6,491,630 B1 | 12/2002 | Saccardo et al. |
| 7,352,570 B2 | 4/2008 | Smith et al. |
| 8,482,259 B2 | 7/2013 | Mueller |
| 9,074,736 B2 | 7/2015 | Recker et al. |
| 2003/0090473 A1 | 5/2003 | Joshi |
| 2004/0215408 A1 | 10/2004 | Lamer et al. |
| 2005/0251035 A1 | 11/2005 | Wong et al. |
| 2008/0055826 A1* | 3/2008 | Smith .................. A61B 90/36 361/679.23 |
| 2009/0043203 A1 | 2/2009 | Pelissier et al. |
| 2010/0262012 A1 | 10/2010 | Wu |
| 2016/0049066 A1 | 2/2016 | Henderson et al. |

OTHER PUBLICATIONS

U.S. Appl. No. 14/825,984, filed Aug. 13, 2015, Henderson et al.
U.S. Appl. No. 14/794,645, filed Jul. 8, 2015, Murphy et al.
International Search Report and Written Opinion issued in related International Patent Application No. PCT/US2015/045088, dated Jul. 14, 2016.

* cited by examiner

MULTI-DISPLAY POWER-UP ANIMATION SYSTEMS AND METHODS

CROSS-REFERENCE TO RELATED APPLICATION

This application claims priority from U.S. Provisional Patent Application No. 62/037,523, filed Aug. 14, 2014. The contents of this application is incorporated herein by reference in its entirety.

BACKGROUND

The present invention relates generally to the field of computing device displays. Computing devices may use multiple displays to convey information to a user and/or display images to a user. Multiple displays may be coordinated by a single device for the display of information and/or images. The present invention includes features which display an animation across multiple displays of a device. In some embodiments of the invention, the device is a portable ultrasound system.

SUMMARY OF THE INVENTION

One embodiment relates to a portable computing device which includes a user interface system including at least a first display and a second display, a memory storing a series of images, a user input device configured to receive an input from a user corresponding to changing a power state of the portable computing device, and a processing circuit coupled to the user interface system, the memory, and the user input device. The processing circuit is configured to receive the input from the user corresponding to changing the power state, determine based on the received input if the input satisfies a trigger condition, and in response to determining that the trigger condition is satisfied, display the series of images on the first display and the second display such that at least one image is displayed on the first display and the second display during a display sequence.

Another embodiment relates to a method of displaying a sequence of images on a portable computing device. The method includes receiving at a user input device an input from a user corresponding to changing a power state of the portable computing device, receiving at a processing circuit the input from the user input device, and determining, using the processing circuit, if the received input satisfies a trigger condition. In response to determining that the trigger condition is satisfied and using the processing circuit, the method further includes reading from memory, a series of images stored in the memory, displaying a first portion of the series of images first on a first display, and then displaying a second portion of the series of images on a second display.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Generally, the invention relates features for a portable ultrasound system. The features enhance the portability, configurability, and functionality of the portable ultrasound system. A portable ultrasound system is typically battery powered. The system may also be powered by mains power when available. The portable ultrasound system may be used for obstetrical and gynecological imaging (e.g., measuring the size of a fetus, checking the position of a fetus, etc.), cardiac imaging (e.g., identifying abnormal heart structures, measuring blood flow, etc.), urological imaging, etc. As portable ultrasound systems may be used in less than ideal conditions (e.g., no ready access to power, no formal work station, etc.), the features described herein help to address the problems associated with such use.

Figure 1:
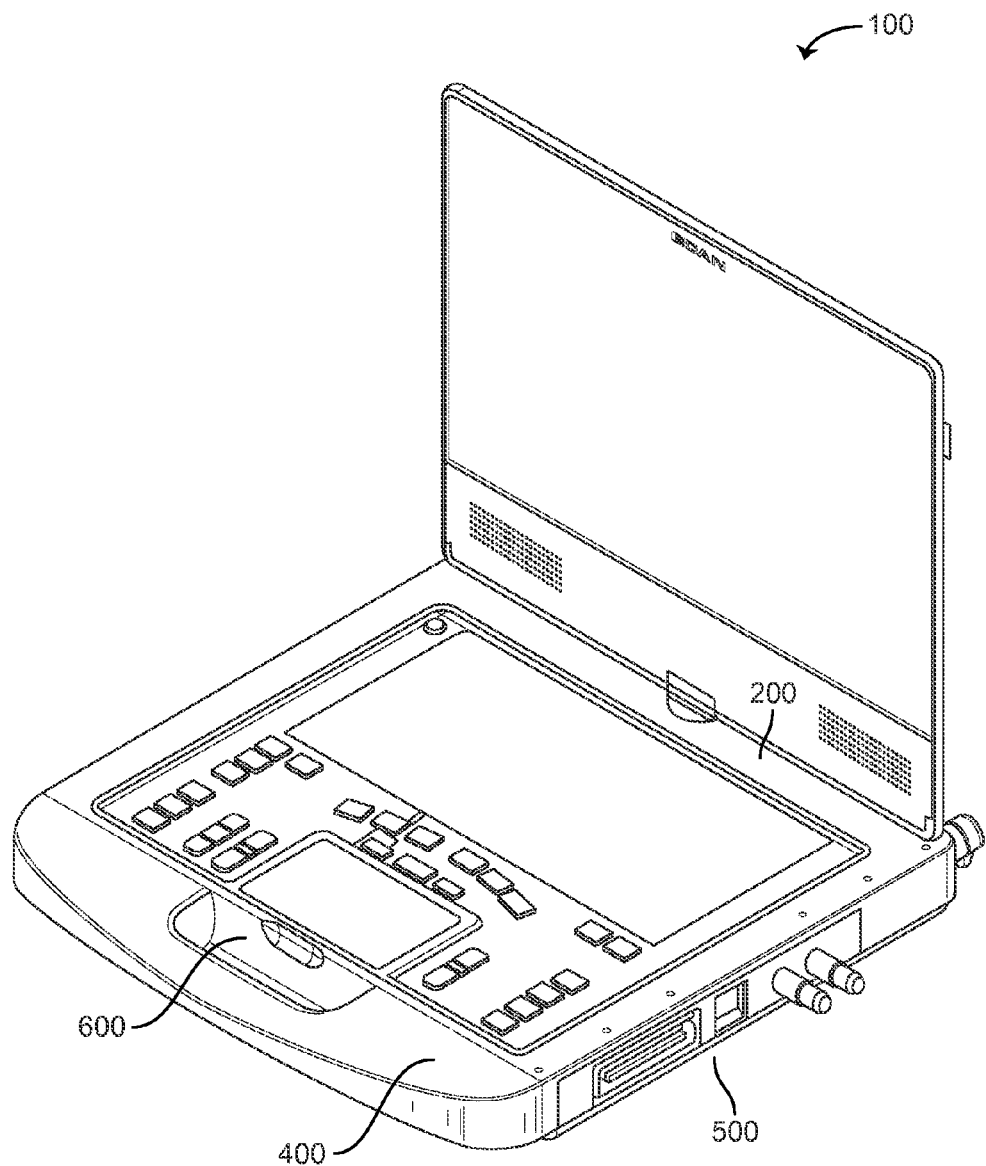
FIG. 1 illustrates an embodiment of a portable ultrasound system incorporating aspects of the invention.

Referring to FIG. 1, one embodiment of portable ultrasound system 100 is illustrated. Portable ultrasound system 100 may include display support system 200 for increasing the durability of the display system. Portable ultrasound system 100 may further include locking lever system 500 for securing ultrasound probes and/or transducers. Some embodiments of portable ultrasound system 100 include ergonomic handle system 400 for increasing portability and usability. Further embodiments include status indicator system 600 which displays, to a user, information relevant to portable ultrasound system 100. Portable ultrasound system 100 may further include features such as an easy to operate and customizable user interface, adjustable feet, a backup battery, modular construction, cooling systems, etc.

Figure 2:
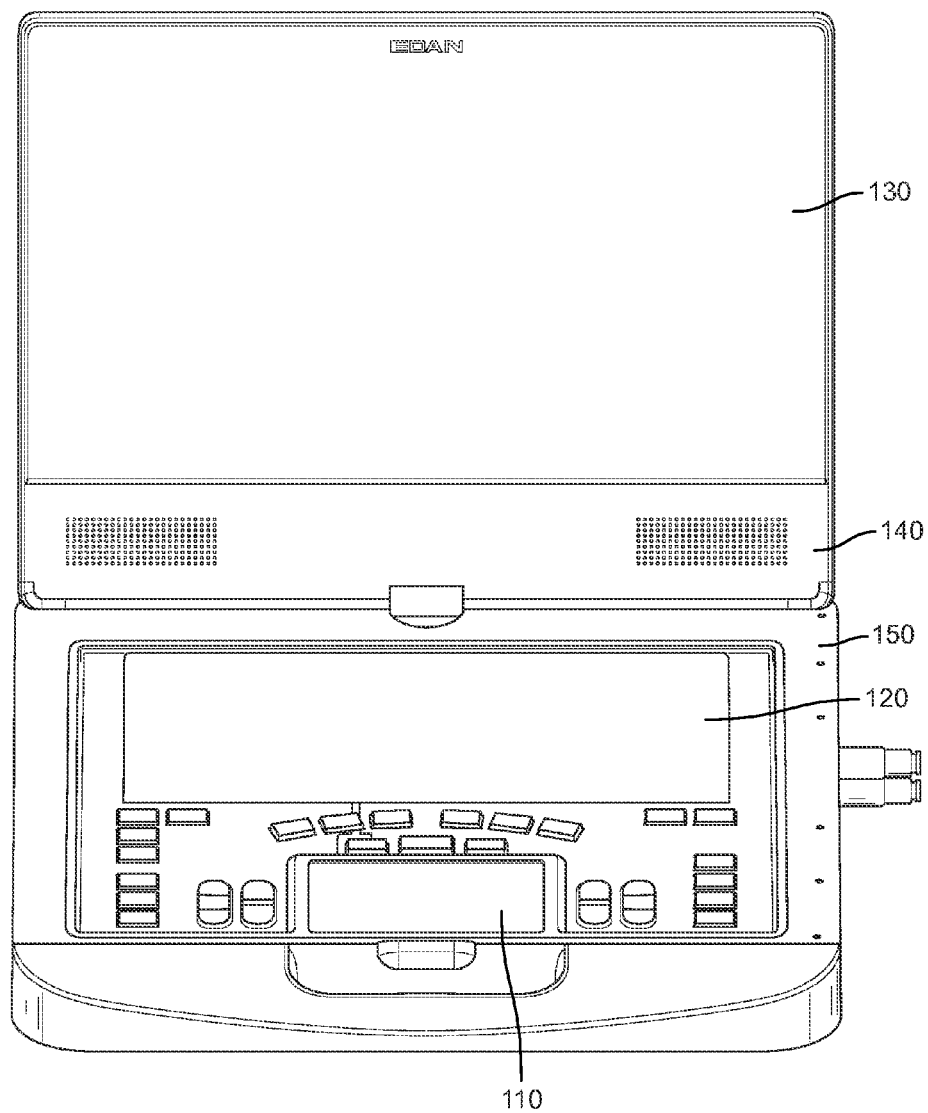
FIG. 2 illustrates a front view of one embodiment of a portable ultrasound system.

Referring to FIG. 2, a front view of one embodiment of portable ultrasound system 100 is illustrated. Main housing 150 houses components of portable ultrasound system 100. In some embodiments, the components housed within main housing 150 include locking lever system 500, ergonomic handle system 400, and status indicator system 600. Main housing 150 may also be configured to support electronics modules which may be replaced and/or upgraded due to the modular construction of portable ultrasound system 100. In some embodiments, portable ultrasound system 100 includes display housing 140. Display housing 140 may include display support system 200. In some embodiments, portable ultrasound system 100 includes touchscreen 110 for receiving user inputs and displaying information, touchscreen 120 for receiving user inputs and displaying information, and main screen 130 for displaying information.

Figure 3:
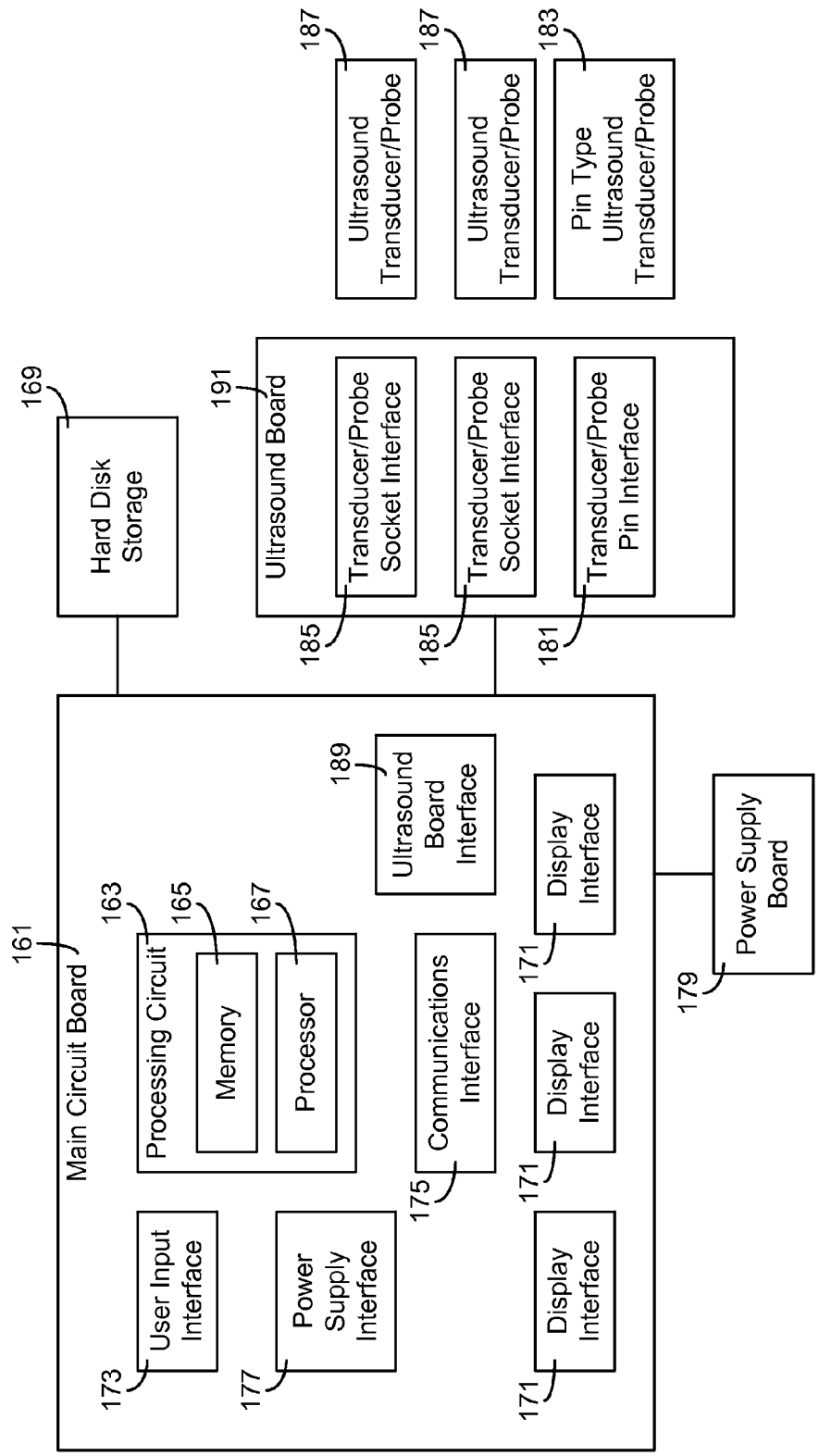
FIG. 3 illustrates a block diagram of components of one embodiment of a portable ultrasound system.

Referring to FIG. 3, a block diagram shows internal components of one embodiment of portable ultrasound system 100. Portable ultrasound system 100 includes main circuit board 161. Main circuit board 161 carries out computing tasks to support the functions of portable ultrasound system 100 and provides connection and communication between various components of portable ultrasound system 100. In some embodiments, main circuit board 161 is configured so as to be a replaceable and/or upgradeable module.

To perform computational, control, and/or communication tasks, main circuit board 161 includes processing circuit 163. Processing circuit 163 is configured to perform general processing and to perform processing and computational tasks associated with specific functions of portable ultrasound system 100. For example, processing circuit 163 may perform calculations and/or operations related to producing an image from signals and or data provided by ultrasound equipment, running an operating system for portable ultrasound system 100, receiving user inputs, etc. Processing circuit 163 may include memory 165 and processor 167 for use in processing tasks. For example, processing circuit may perform calculations and/or operations.

Processor 167 may be, or may include, one or more microprocessors, application specific integrated circuits (ASICs), circuits containing one or more processing components, a group of distributed processing components, circuitry for supporting a microprocessor, or other hardware configured for processing. Processor 167 is configured to execute computer code. The computer code may be stored in memory 165 to complete and facilitate the activities described herein with respect to portable ultrasound system 100. In other embodiments, the computer code may be retrieved and provided to processor 167 from hard disk storage 169 or communications interface 175 (e.g., the computer code may be provided from a source external to main circuit board 161).

Memory 165 can be any volatile or non-volatile computer-readable storage medium capable of storing data or computer code relating to the activities described herein. For example, memory 165 may include modules which are computer code modules (e.g., executable code, object code, source code, script code, machine code, etc.) configured for execution by processor 167. Memory 165 may include computer executable code related to functions including ultrasound imaging, battery management, handling user inputs, displaying data, transmitting and receiving data using a wireless communication device, etc. In some embodiments, processing circuit 163 may represent a collection of multiple processing devices (e.g., multiple processors, etc.). In such cases, processor 167 represents the collective processors of the devices and memory 165 represents the collective storage devices of the devices. When executed by processor 167, processing circuit 163 is configured to complete the activities described herein as associated with portable ultrasound system 100.

Hard disk storage 169 may be a part of memory 165 and/or used for non-volatile long term storage in portable ultrasound system 100. Hard disk storage 169 may store local files, temporary files, ultrasound images, patient data, an operating system, executable code, and any other data for supporting the activities of portable ultrasound device 100 described herein. In some embodiments, hard disk storage is embedded on main circuit board 161. In other embodiments, hard disk storage 169 is located remote from main circuit board 161 and coupled thereto to allow for the transfer of data, electrical power, and/or control signals. Hard disk 169 may be an optical drive, magnetic drive, a solid state hard drive, flash memory, etc.

In some embodiments, main circuit board 161 includes communications interface 175. Communications interface 175 may include connections which enable communication between components of main circuit board 161 and communications hardware. For example, communications interface 175 may provide a connection between main circuit board 161 and a network device (e.g., a network card, a wireless transmitter/receiver, etc.). In further embodiments, communications interface 175 may include additional circuitry to support the functionality of attached communications hardware or to facilitate the transfer of data between communications hardware and main circuit board 161. In other embodiments, communications interface 175 may be a system on a chip (SOC) or other integrated system which allows for transmission of data and reception of data. In such a case, communications interface 175 may be coupled directly to main circuit board 161 as either a removable package or embedded package.

Some embodiments of portable ultrasound system 100 include power supply board 179. Power supply board 179 includes components and circuitry for delivering power to components and devices within and/or attached to portable ultrasound system 100. In some embodiments, power supply board 179 includes components for alternating current and direct current conversion, for transforming voltage, for delivering a steady power supply, etc. These components may include transformers, capacitors, modulators, etc. to perform the above functions. In further embodiments, power supply board 179 includes circuitry for determining the available power of a battery power source. In other embodiments, power supply board 179 includes circuitry for switching between power sources. For example, power supply board 179 may draw power from a backup battery while a main battery is switched. In further embodiments, power supply board 179 includes circuitry to operate as an uninterruptable power supply in conjunction with a backup battery. Power supply board 179 also includes a connection to main circuit board 161. This connection may allow power supply board 179 to send and receive information from main circuit board 161. For example, power supply board 179 may send information to main circuit board 161 allowing for the determination of remaining battery power. The connection to main circuit board 161 may also allow main circuit board 161 to send commands to power supply board 179. For example, main circuit board 161 may send a command to power supply board 179 to switch from source of power to another (e.g., to switch to a backup battery while a main battery is switched). In some embodiments, power supply board 179 is configured to be a module. In such cases, power supply board 179 may be configured so as to be a replaceable and/or upgradeable module.

Main circuit board 161 may also include power supply interface 177 which facilitates the above described communication between power supply board 179 and main circuit board 161. Power supply interface 177 may include connections which enable communication between components of main circuit board 161 and power supply board 179. In further embodiments, power supply interface 177 includes additional circuitry to support the functionality of power supply board 179. For example, power supply interface 177 may include circuitry to facilitate the calculation of remaining battery power, manage switching between available power sources, etc. In other embodiments, the above described functions of power supply board 179 may be carried out by power supply interface 177. For example, power supply interface 177 may be a SOC or other integrated system. In such a case, power supply interface 177 may be coupled directly to main circuit board 161 as either a removable package or embedded package.

With continued reference to FIG. 3, some embodiments of main circuit board 161 include user input interface 173. User input interface 173 may include connections which enable communication between components of main circuit board 161 and user input device hardware. For example, user input interface 173 may provide a connection between main circuit board 161 and a capacitive touchscreen, resistive touchscreen, mouse, keyboard, buttons, and/or a controller for the proceeding. In one embodiment, user input interface 173 couples controllers for touchscreen 110, touchscreen 120, and main screen 130 to main circuit board 161. In other embodiments, user input interface 173 includes controller circuitry for touchscreen 110, touchscreen 120, and main screen 130. In some embodiments, main circuit board 161 includes a plurality of user input interfaces 173. For example, each user input interface 173 may be associated with a single input device (e.g., touchscreen 110, touchscreen 120, a keyboard, buttons, etc.).

In further embodiments, user input interface 173 may include additional circuitry to support the functionality of attached user input hardware or to facilitate the transfer of data between user input hardware and main circuit board 161. For example, user input interface 173 may include controller circuitry so as to function as a touchscreen controller. User input interface 173 may also include circuitry for controlling haptic feedback devices associated with user input hardware. In other embodiments, user input interface 173 may be a SOC or other integrated system which allows for receiving user inputs or otherwise controlling user input hardware. In such a case, user input interface 173 may be coupled directly to main circuit board 161 as either a removable package or embedded package.

Main circuit board 161 may also include ultrasound board interface 189 which facilitates communication between ultrasound board 179 and main circuit board 161. Ultrasound board interface 189 may include connections which enable communication between components of main circuit board 161 and ultrasound board 191. In further embodiments, ultrasound board interface 189 includes additional circuitry to support the functionality of ultrasound board 191. For example, ultrasound board interface 189 may include circuitry to facilitate the calculation of parameters used in generating an image from ultrasound data provided by ultrasound board 191. In some embodiments, ultrasound board interface 189 is a SOC or other integrated system. In such a case, ultrasound board interface 189 may be coupled directly to main circuit board 161 as either a removable package or embedded package.

In other embodiments, ultrasound board interface 189 includes connections which facilitate use of a modular ultrasound board 191. Ultrasound board 191 may be a module (e.g., ultrasound module) capable of performing functions related to ultrasound imaging (e.g., multiplexing sensor signals from an ultrasound probe/transducer, controlling the frequency of ultrasonic waves produced by an ultrasound probe/transducer, etc.). The connections of ultrasound board interface 189 may facilitate replacement of ultrasound board 191 (e.g., to replace ultrasound board 191 with an upgraded board or a board for a different application). For example, ultrasound board interface 189 may include connections which assist in accurately aligning ultrasound board 191 and/or reducing the likelihood of damage to ultrasound board 191 during removal and or attachment (e.g., by reducing the force required to connect and/or remove the board, by assisting, with a mechanical advantage, the connection and/or removal of the board, etc.).

In embodiments of portable ultrasound system 100 including ultrasound board 191, ultrasound board 191 includes components and circuitry for supporting ultrasound imaging functions of portable ultrasound system 100. In some embodiments, ultrasound board 191 includes integrated circuits, processors, and memory. Ultrasound board 191 may also include one or more transducer/probe socket interfaces 185. Transducer/probe socket interface 185 enables ultrasound transducer/probe 187 (e.g., a probe with a socket type connector) to interface with ultrasound board 191. For example, transducer/probe socket interface 185 may include circuitry and/or hardware connecting ultrasound transducer/probe 187 to ultrasound board 191 for the transfer of electrical power and/or data. Transducer/probe socket interface 185 may include hardware which locks ultrasound transducer/probe 187 into place (e.g., a slot which accepts a pin on ultrasound transducer/probe 187 when ultrasound transducer/probe 187 is rotated). In some embodiments, ultrasound board 191 includes two transducer/probe socket interfaces 185 to allow the connection of two socket type ultrasound transducers/probes 187.

In some embodiments, ultrasound board 191 also includes one or more transducer/probe pin interfaces 181. Transducer/probe pin interface 181 enables ultrasound transducer/probe 183 (e.g., a probe with a pin type connector) to interface with ultrasound board 191. Transducer/probe pin interface 181 may include circuitry and/or hardware connecting ultrasound transducer/probe 183 to ultrasound board 191 for the transfer of electrical power and/or data. Transducer/probe pin interface 181 may include hardware which locks ultrasound transducer/probe 183 into place. In some embodiments, ultrasound transducer/probe 183 is locked into place with locking lever system 500. In some embodiments, ultrasound board 191 includes more than one transducer/probe pin interfaces 181 to allow the connection of two or more pin type ultrasound transducers/probes 183. In such cases, portable ultrasound system 100 may include one or more locking lever systems 500. In further embodiments, ultrasound board 191 may include interfaces for additional types of transducer/probe connections.

With continued reference to FIG. 3, some embodiments of main circuit board 161 include display interface 171. Display interface 171 may include connections which enable communication between components of main circuit board 161 and display device hardware. For example, display interface 171 may provide a connection between main circuit board 161 and a liquid crystal display, a plasma display, a cathode ray tube display, a light emitting diode display, and/or a display controller or graphics processing unit for the proceeding or other types of display hardware. In some embodiments, the connection of display hardware to main circuit board 161 by display interface 171 allows a processor or dedicated graphics processing unit on main circuit board 161 to control and/or send data to display hardware. Display interface 171 may be configured to send display data to display device hardware in order to produce an image. In some embodiments, main circuit board 161 includes multiple display interfaces 171 for multiple display devices (e.g., three display interfaces 171 connect three displays to main circuit board 161). In other embodiments, one display interface 171 may connect and/or support multiple displays. In one embodiment, three display interfaces 171 couple touchscreen 110, touchscreen 120, and main screen 130 to main circuit board 161.

In further embodiments, display interface 171 may include additional circuitry to support the functionality of attached display hardware or to facilitate the transfer of data between display hardware and main circuit board 161. For example, display interface 171 may include controller circuitry, a graphics processing unit, video display controller, etc. In some embodiments, display interface 171 may be a SOC or other integrated system which allows for displaying images with display hardware or otherwise controlling display hardware. Display interface 171 may be coupled directly to main circuit board 161 as either a removable package or embedded package. Processing circuit 163 in conjunction with one or more display interfaces 171 may display images on one or more of touchscreen 110, touchscreen, 120, and main screen 130.

Generally, display circuitry may provide for the display of an image on a display screen. The image may result from user input (e.g., a pointer displayed as moving across a display in response to user input on a touch device or through a computer mouse). The image may also be one that is displayed upon the occurrence of certain triggering events, inputs, and/or objects. For example, an image (static or comprising a series of frames so as to appear to be moving and/or changing) may be displayed following a command from the user to power on a device which incorporates the display, turn off the device, change a setting related to the device, enter an input, etc. In some embodiments, the image or series of images are stored in memory as instructions for displaying the image or series of images. These instructions are retrieved from memory by the display circuitry, processed, and used to control a display screen. In some embodiments of the invention, an image is displayed using multiple displays of a multi-display device.

Referring now to FIG. 3, one embodiment of the invention includes displaying images on a portable ultrasound system 100. In other embodiments, images may be displayed on or with other devices (e.g., portable computing devices, personal computing devices, etc.). In some embodiments, main circuit board 161 and/or one or more display interfaces 171 control one or more displays. The displays are controlled to produce one or more images on one or more displays. Processing circuit 163 may determine what images and the characteristics of those images to display. Processing circuit 163 may further determine on which display to display the images in the case of a multi-display device. In some embodiments, these determinations are made based on user inputs. In other embodiments, the determinations are made in response to triggering events, inputs, and/or objects. Processing circuit 163 may make these determinations by executing, using processor 167, instructions or computer code stored in memory 165, stored in hard disk storage 169, and/or acquired using communications interface 175. In some embodiments, processing circuit 163 retrieves, from memory 165 and/or hard disk storage 169, display instructions for an image to be displayed in response to executed code and/or instructions. Processing circuit 163 may then send control instructions to one or more display interfaces 171 which display an image according to those instructions on one or more displays. In some embodiments, main circuit board 161 and/or display interface 171 may include a graphics processing unit which performs or assists in preforming these functions.

For some events, instructions for displaying a certain corresponding image or series of images may be stored in memory 165 and/or hard disk storage 169. The occurrence of an event may trigger an instance in which processor 167 retrieves the instructions and executes them. One such event may be the powering on of a device. By executing the instructions for displaying an image corresponding to an event, processing circuit 163, one or more display interfaces 171, and/or display hardware cause an image or series of images to be displayed to a user. The following FIGS. 4-18 are illustrations representative of computer code and/or instruction steps which when executed display the depicted graphical representation. FIGS. 4-18 correspond to the display of a series of images which are triggered by the powering-up (e.g., turning on) of portable ultrasound system 100. In further embodiments, the series of images are triggered by other conditions such as portable ultrasound system 100 exiting a standby mode, exiting a sleep mode, exiting a hibernation mode, exiting a low power mode, a lid of portable ultrasound system 100 being opened, and/or other conditions or occurrences. The series of images are displayed across multiple displays. Displaying a series of images across all displays of a device on startup has the advantage of informing the user that all displays are functioning. In other embodiments, different images may be displayed, different triggering events may precede the display of an image or series of images, and/or the images or series of images may be displayed on different devices. The series of images displayed may constitute an animation.

Figure 4:
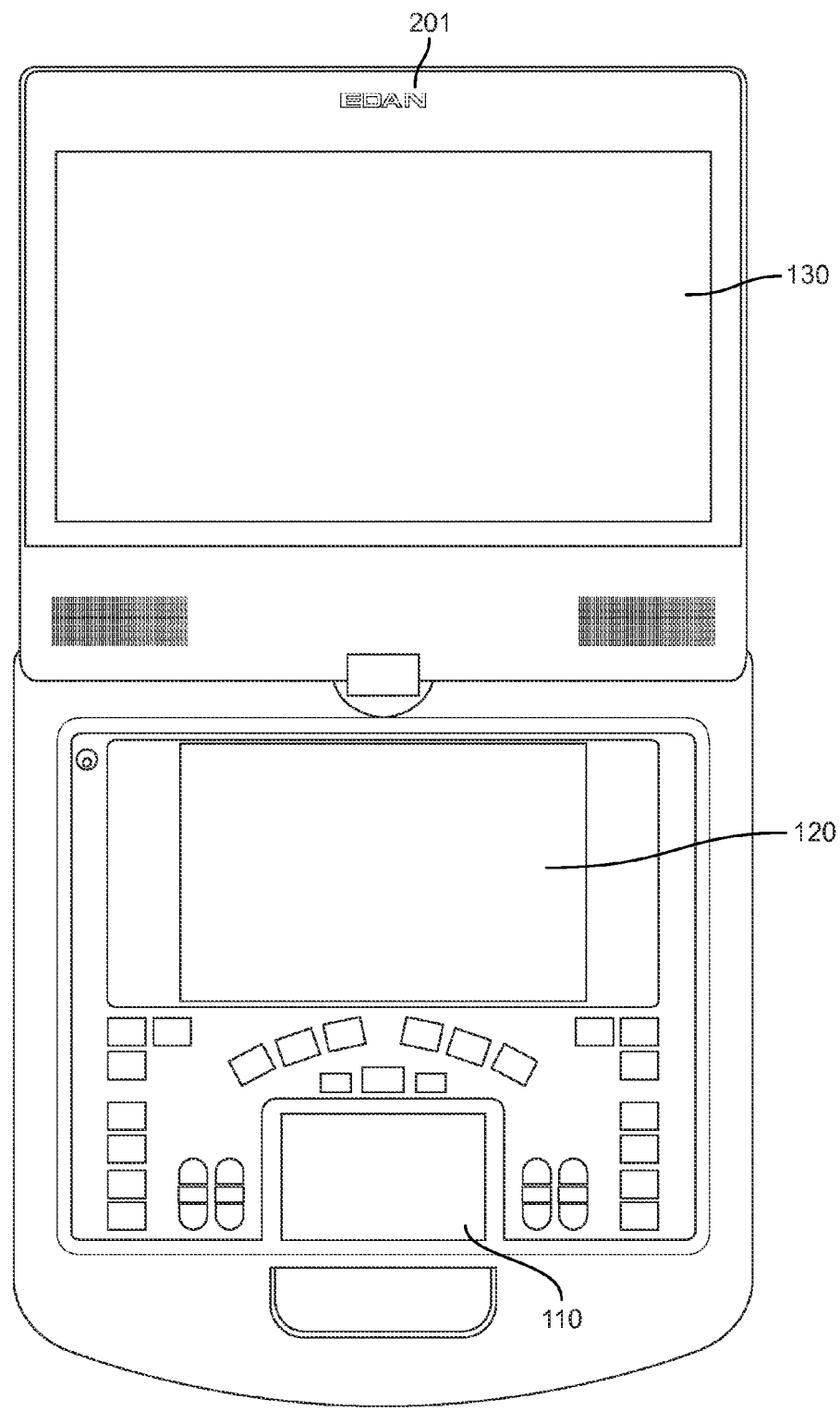
FIG. 4 illustrates a multi-display device prior to a multi-display animation according to one embodiment of the invention.

FIG. 4 illustrates an embodiment of the invention in which the displays do not display an image prior to the occurrence of a triggering event. Portable ultrasound system 100 has not yet received a user command to initiate the power-up sequence. In some embodiments, portable ultrasound device has three displays including touchscreen 110, touchscreen 120, and main screen 130. Some embodiments of portable ultrasound system 100 further include a hardware logo 201 which may illuminate. In some embodiments, hardware logo 201 illuminates upon completion of a startup sequence and animation (e.g., after the system is powered up and the corresponding series of images have been displayed). Hardware logo 201 may be a transparent or semi-transparent material backed by a light source such as a light emitting diode. In some embodiments, hardware logo 201 is located on a face of the device oriented towards a user. In other embodiments, hardware logo 201 may be located on other faces of the device such as the back, side, etc. Upon receiving a startup or power-up command from a user, the power-up animation sequence initiates. This may be accomplished using the techniques and components described above.

Figure 5:
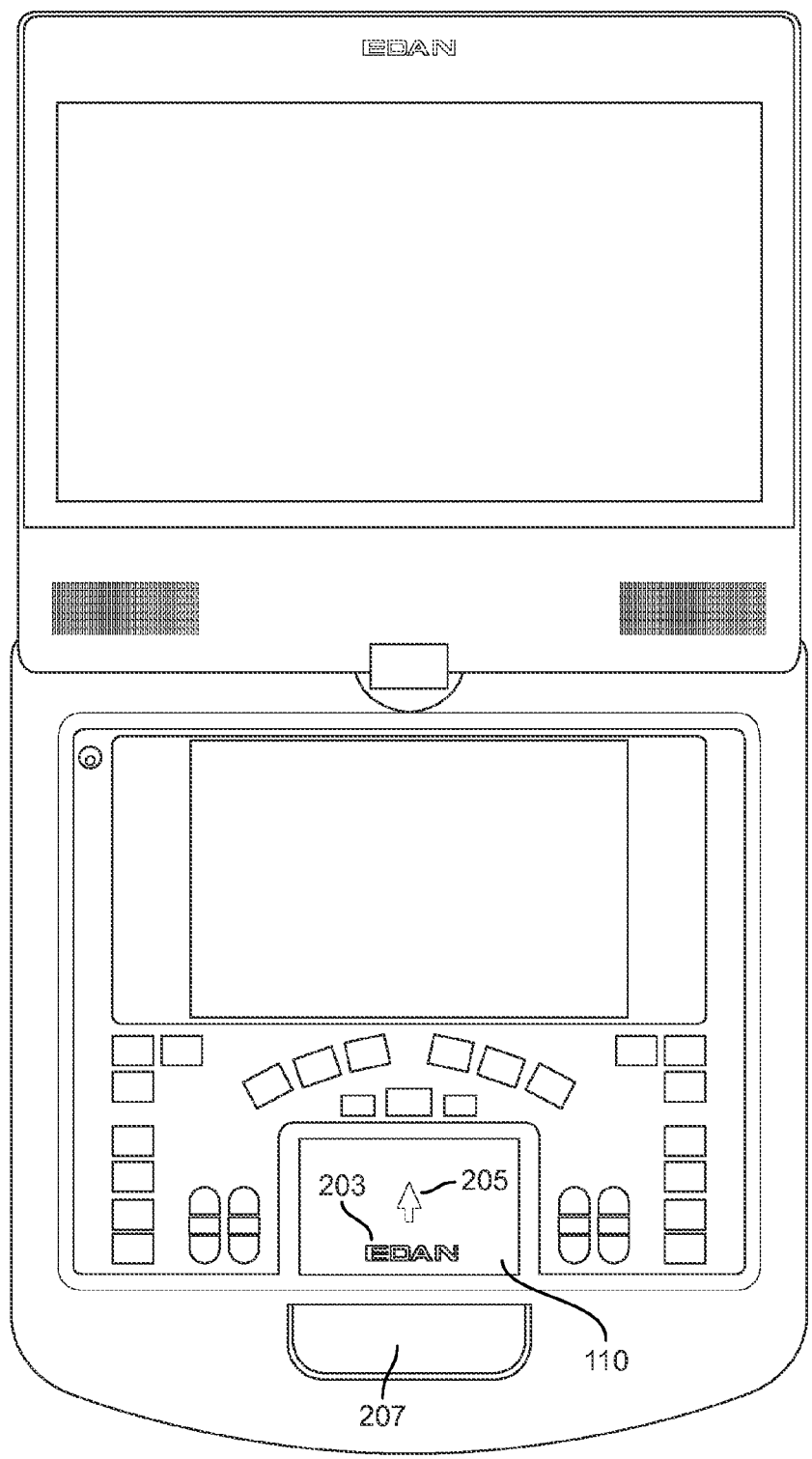
FIG. 5 illustrates an image appearing on a first display during a multi-display animation on a multi-display device according to one embodiment of the invention.

FIG. 5 illustrates an image appearing on the first display. In some embodiments, logo 203 appears beginning at the bottom of touchscreen 110. Logo 203 may appear to be entering touchscreen 110 from beneath handle 207 traveling in direction 205. For example, the top of logo 203 may appear on touchscreen 110 with the rest of logo 203 appearing to be obscured or hidden behind handle 207. Logo 203 then appears to scroll up or travel along direction 205. As logo 203 travels, the middle and then entirety of the logo appear to come from beneath handle 207 as logo 203 travels towards the middle of touchscreen 110. In some embodiments, logo 203 enters from beneath handle 207 over a time period of one second.

In other embodiments, logo 203 may appear to fade in near the bottom of touchscreen 110. The entirety of logo 203 may be displayed near the bottom of touchscreen 110 with little brightness and/or intensity. In incremental steps, logo 203 may be displayed with increasing brightness/intensity. These incremental steps may occur with logo 203 fixed near the bottom of touchscreen 110 until logo 203 is fully displayed. Logo 203 may then appear to travel in direction 205 towards the middle of touchscreen 110. In other embodiments, logo 203 may increase in brightness/intensity as it travels in direction 205. In further embodiments, logo 203 may increase in brightness/intensity as it appears to enter touchscreen 110 from beneath handle 207. Logo 203 may appear to fade in at the bottom of touchscreen 110. In some embodiments, logo 203 fades in over a time period of one second.

Figure 6:
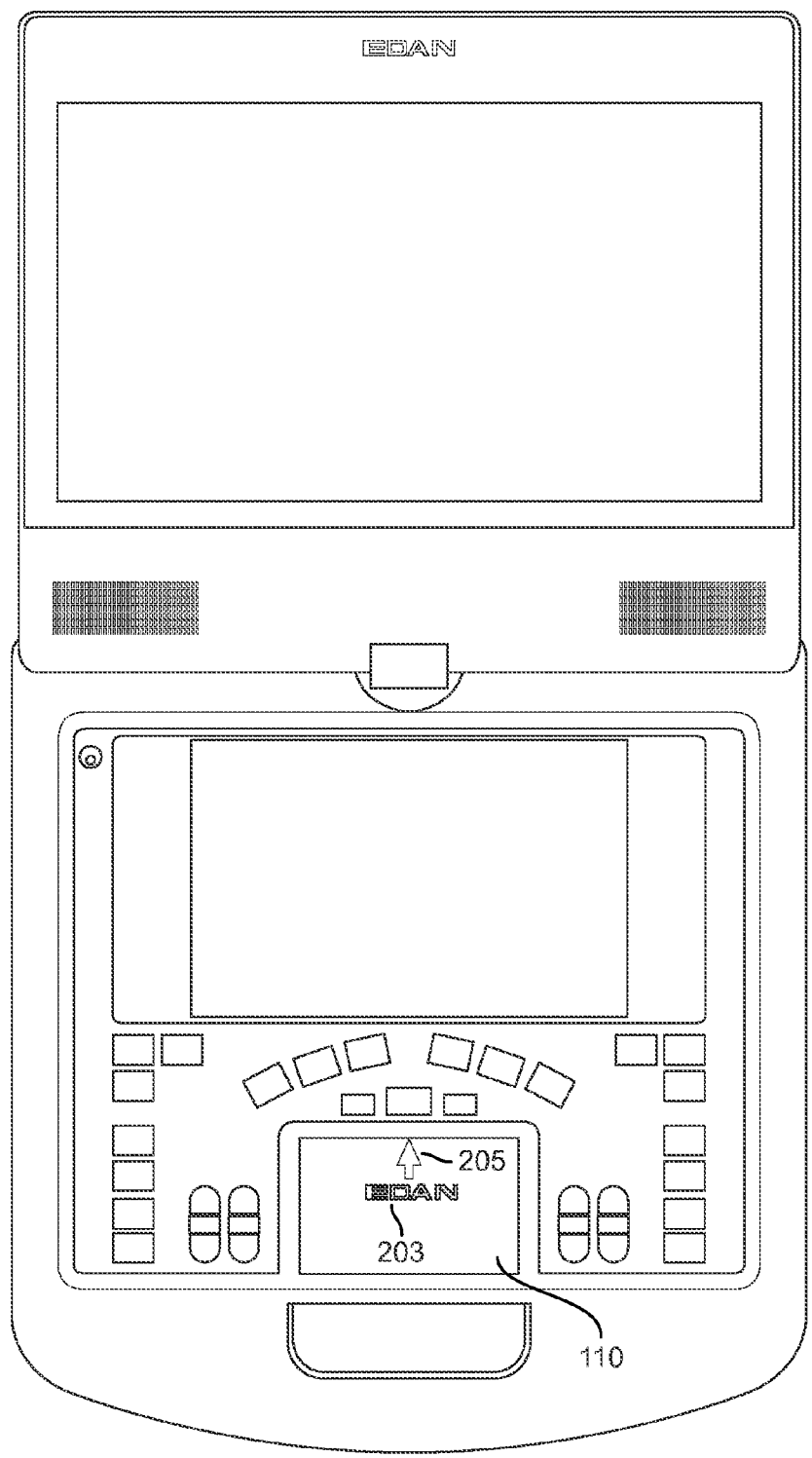
FIG. 6 illustrates an image moving on a first display during a multi-display animation on a multi-display device according to one embodiment of the invention.

FIG. 6 illustrates logo 203 after the entirety of logo 203 has been displayed on touchscreen 110 and has begun to travel in direction 205. Logo 203 has finished its apparent transition from handle 207 or otherwise appeared on touchscreen 110 and is moving in direction 205. Logo 203 moves in direction 205 through the middle of touchscreen 110 and towards the top of touchscreen 110. In some embodiments, logo 203 travels across touchscreen 110 in direction 205 in one second. In alternative embodiments, logo 203 travels across touchscreen 110 over the course of a different amount of time (e.g., 2 seconds). In still further embodiments, the time during which logo 203 travels across touchscreen 110 varies depending on the condition which triggers the animation (e.g., logo 203 travels across touchscreen 110 more rapidly when portable ultrasound system 100 exits sleep mode than when portable ultrasound system 100 is being turned on from a powered off state).

Figure 7:
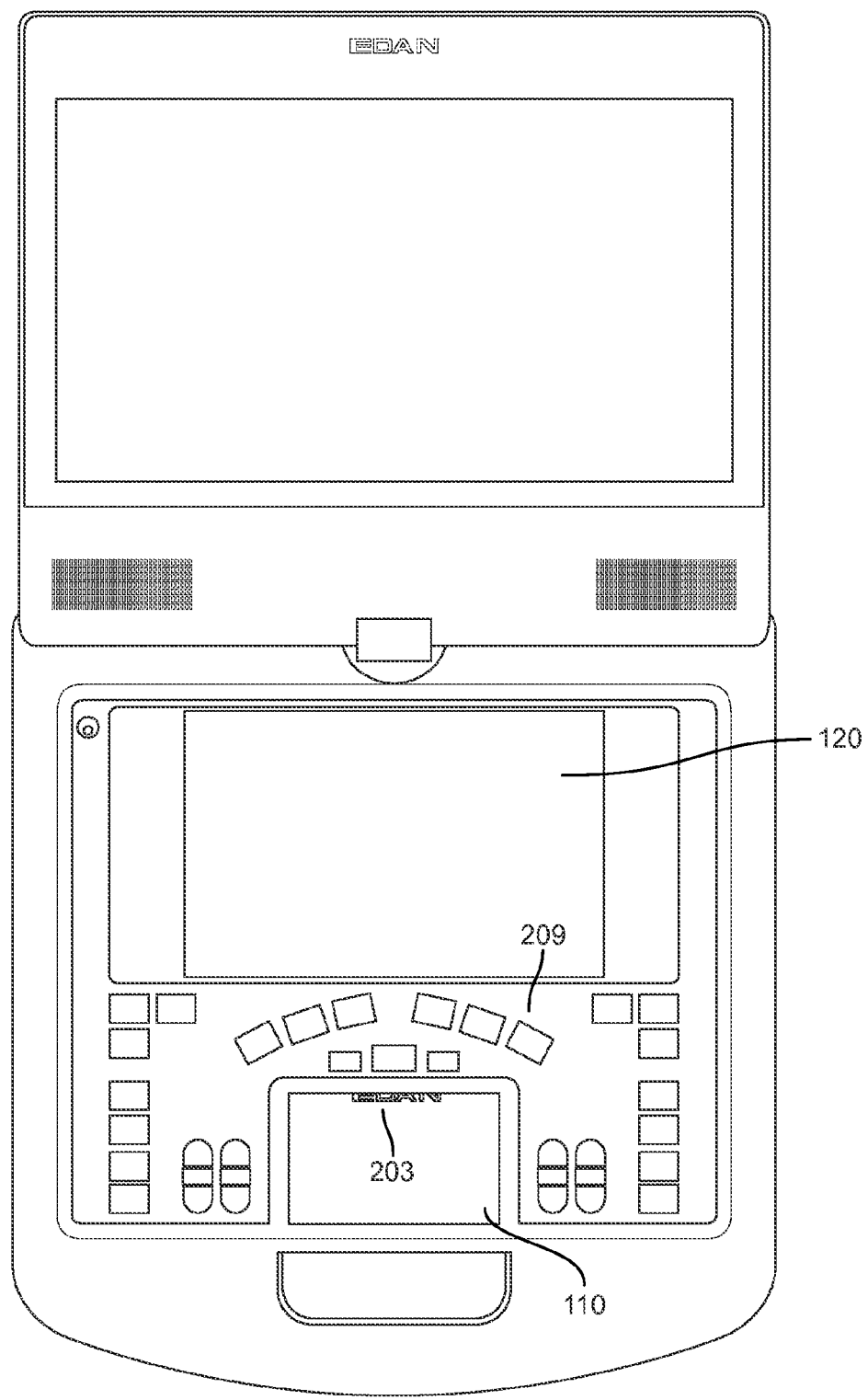
FIG. 7 illustrates an image leaving a first display during a multi-display animation on a multi-display device according to one embodiment of the invention.

FIG. 7 illustrates logo 203 appearing to exit touchscreen 110. Once logo 203 has reached the top edge of touchscreen 110, logo 203 appears to move under keyboard 209. Logo 203 continues to move in direction 205 traveling from the middle of touchscreen 110 to the upper edge of touchscreen 110. Logo 203 appears to continue traveling in direction 205 until the entirety of logo 203 has appeared to travel beneath keyboard 209 while leaving touchscreen 110. In some embodiments, logo 203 exits touchscreen 110 over the course of one second. In alternative embodiments, logo 203 exits touchscreen 110 over the course of a different amount of time (e.g., 2 seconds). In still further embodiments, the time during which logo 203 exits touchscreen 110 varies depending on the condition which triggers the animation (e.g., logo 203 travels across touchscreen 110 more rapidly when portable ultrasound system 100 exits sleep mode than when portable ultrasound system 100 is being turned on from a powered off state).

Figure 8:
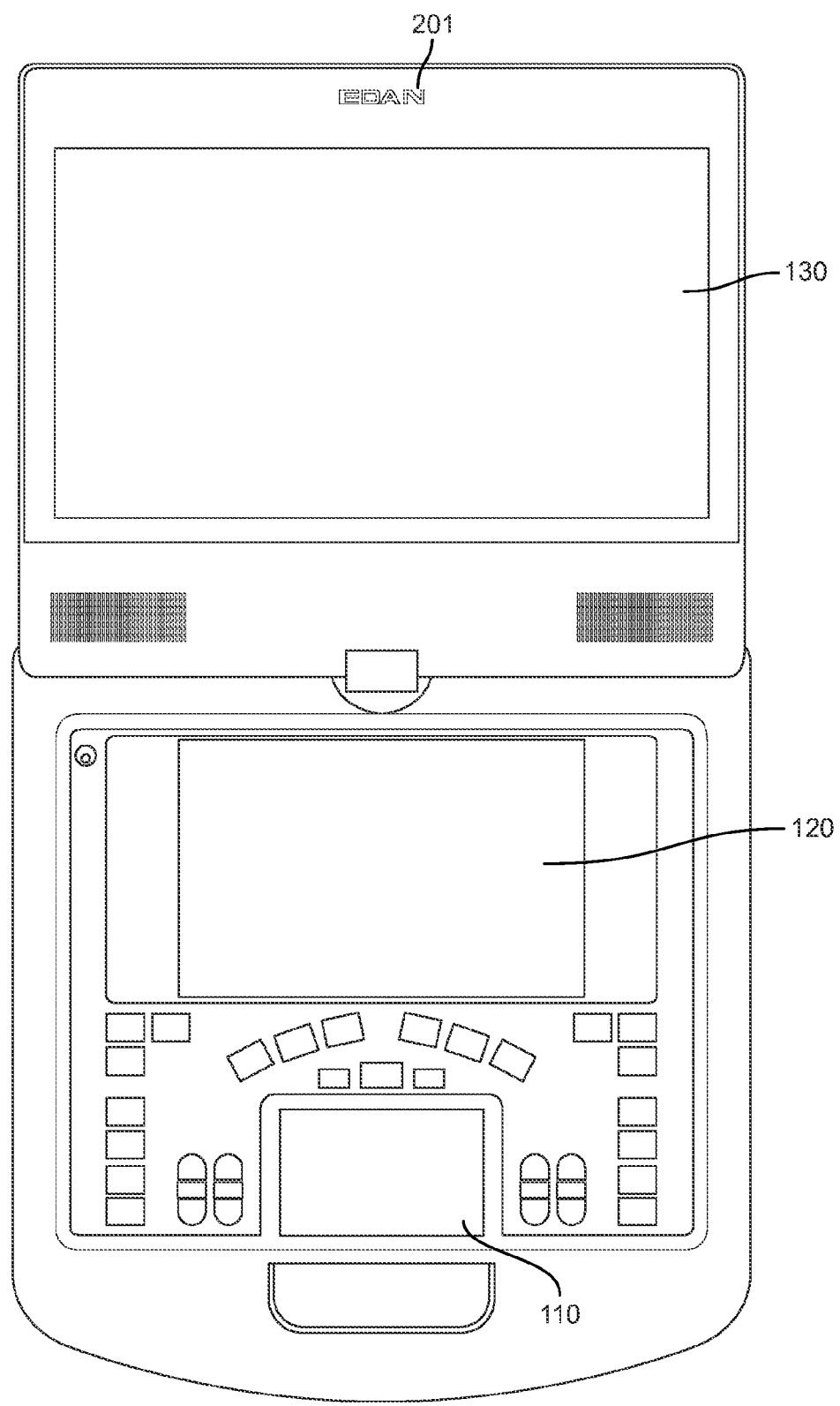
FIG. 8 illustrates an image which has left a first display during a multi-display animation on a multi-display device according to one embodiment of the invention.

FIG. 8 illustrates logo 203 in transition from one display to another. Specifically, logo 203, or any part thereof, is not displayed. Logo 203 appears to be completely obscured behind keyboard 209. In some embodiments, touchscreen 110, touchscreen 120, and main screen 130 do not display an image. After a set amount of time, logo 203 appears to enter touchscreen 120. In some embodiments, logo 203 may appear to be obscured by keyboard 209 for one second. In alternative embodiments, logo 203 may appear to be obscured by keyboard 209 over the course of a different amount of time (e.g., 2 seconds). In still further embodiments, the time during which logo 203 may appear to be obscured by keyboard 209 varies depending on the condition which triggers the animation (e.g., logo 203, which may appear to be obscured by keyboard 209, is obscured for less time when portable ultrasound system 100 exits sleep mode than when portable ultrasound system 100 is being turned on from a powered off state).

Figure 9:
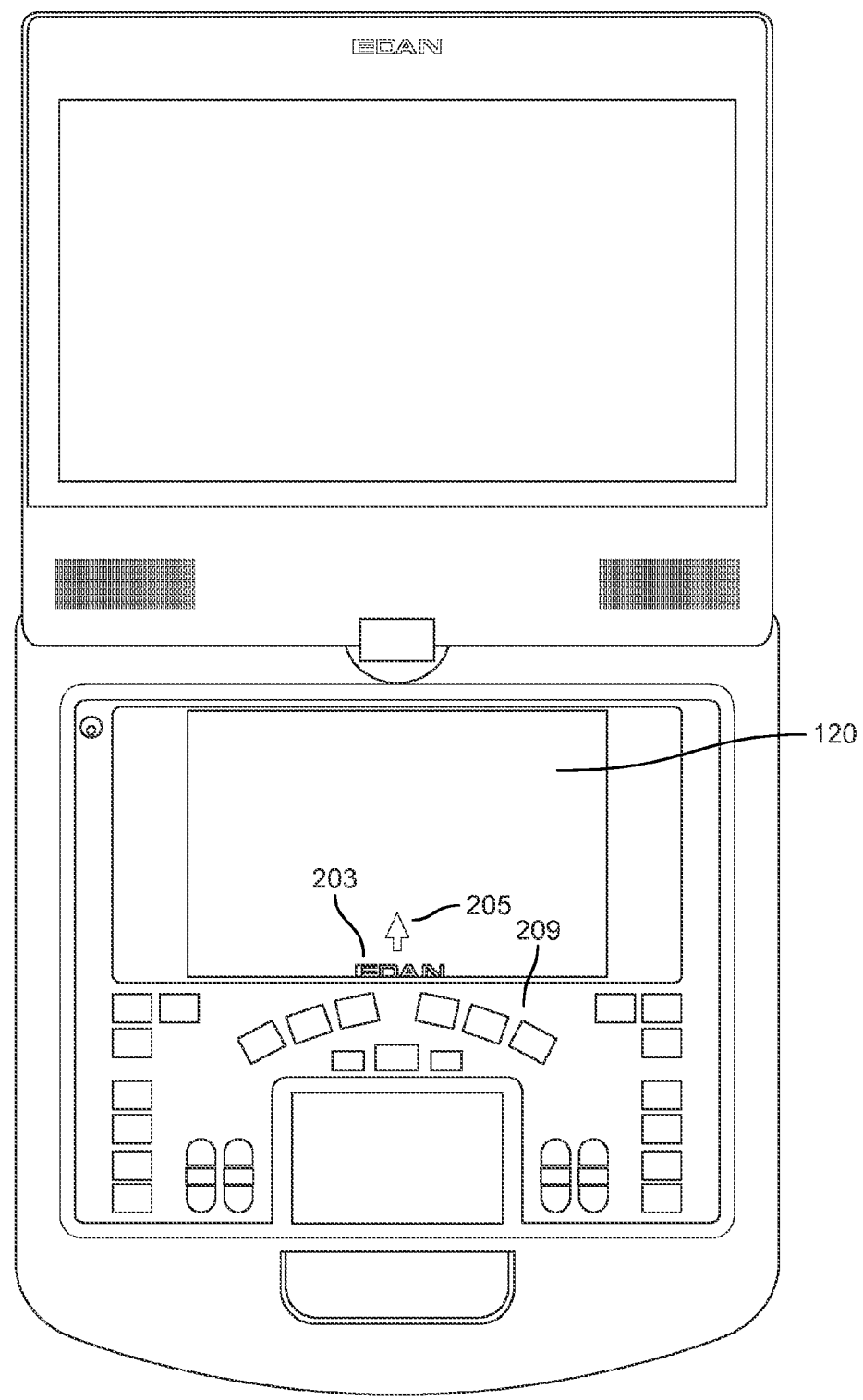
FIG. 9 illustrates an image entering a second display during a multi-display animation on a multi-display device according to one embodiment of the invention.

FIG. 9 illustrates an image appearing on the second display. In some embodiments, logo 203 appears beginning at the bottom of touchscreen 120. Logo 203 may appear to be entering touchscreen 120 from beneath keyboard 209 traveling in direction 205. For example, the top of logo 203 may appear on touchscreen 120 with the rest of logo 203 appearing to be obscured or hidden behind keyboard 209. Logo 203 then appears to scroll up or travel along direction 205. As logo 203 travels, the middle and then entirety of the logo appear to come from beneath keyboard 209 as logo 203 travels towards the middle of touchscreen 120. In some embodiments, logo 203 enters from beneath keyboard 209 over a time period of one second.

In other embodiments, logo 203 may appear to fade in near the bottom of touchscreen 120. The entirety of logo 203 may be displayed near the bottom of touchscreen 120 with little brightness and/or intensity. In incremental steps, logo 203 may be displayed with increasing brightness/intensity. These incremental steps may occur with logo 203 fixed near the bottom of touchscreen 120 until logo 203 is fully displayed. Logo 203 may then appear to travel in direction 205 towards the middle of touchscreen 120. In other embodiments, logo 203 may increase in brightness/intensity as it travels in direction 205. In further embodiments, logo 203 may increase in brightness/intensity as it appears to enter touchscreen 120 from beneath keyboard 209. Logo 203 may appear to fade in at the bottom of touchscreen 120. In some embodiments, logo 203 fades in over a time period of one second. In alternative embodiments, this time period may be different or vary as previously described above with respect to other time periods.

Figure 10:
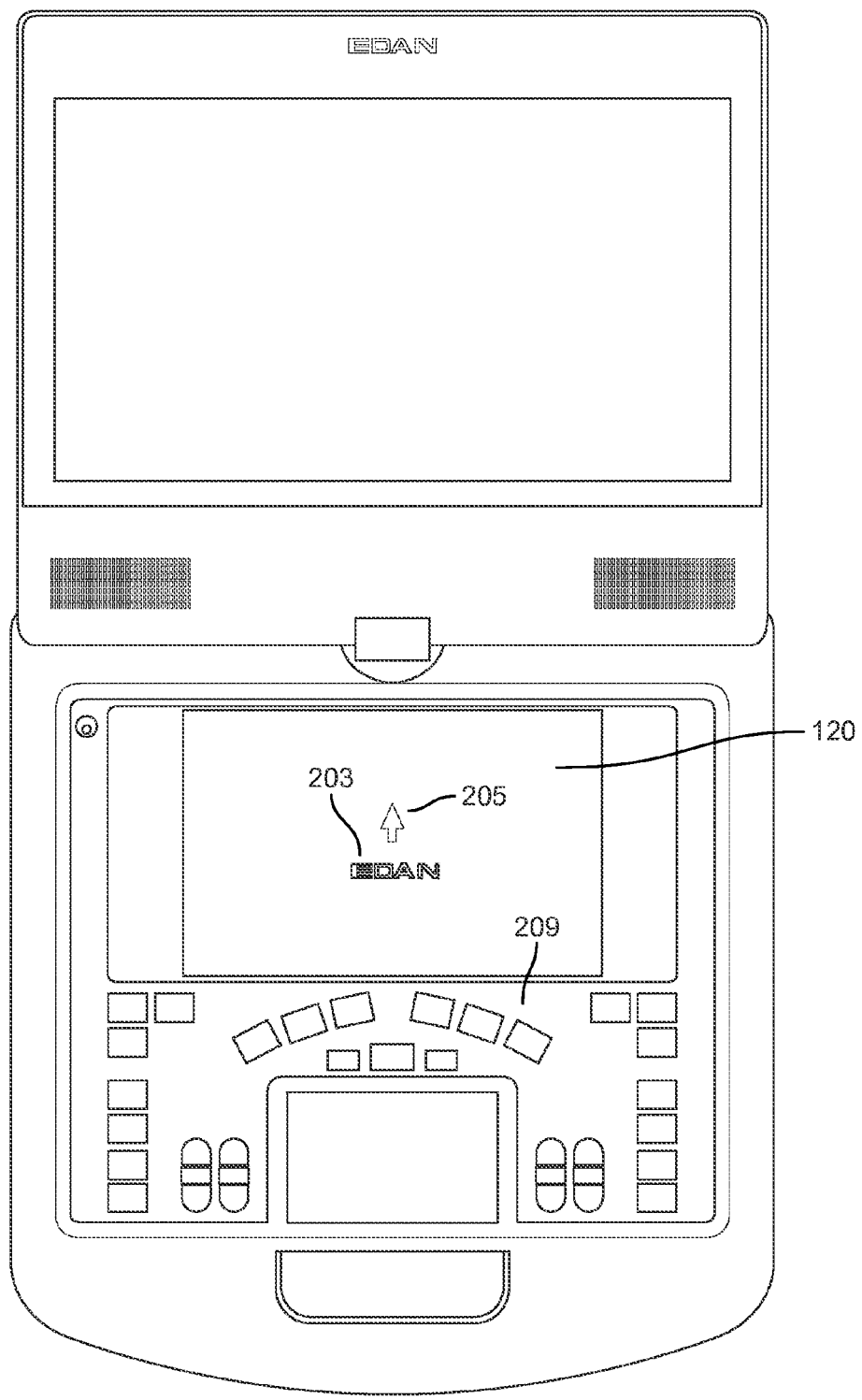
FIG. 10 illustrates an image moving on a second display during a multi-display animation on a multi-display device according to one embodiment of the invention.

FIG. 10 illustrates logo 203 after the entirety of logo 203 has been displayed on touchscreen 120 and has begun to travel in direction 205. Logo 203 has finished its apparent transition from keyboard 209 or otherwise appeared on touchscreen 120 and is moving in direction 205. Logo 203 moves in direction 205 through the middle of touchscreen 120 and towards the top of touchscreen 120. In some embodiments, logo 203 travels across touchscreen 120 in direction 205 in one second. In alternative embodiments, this time period may be different or vary as previously described above with respect to other time periods.

Figure 11:
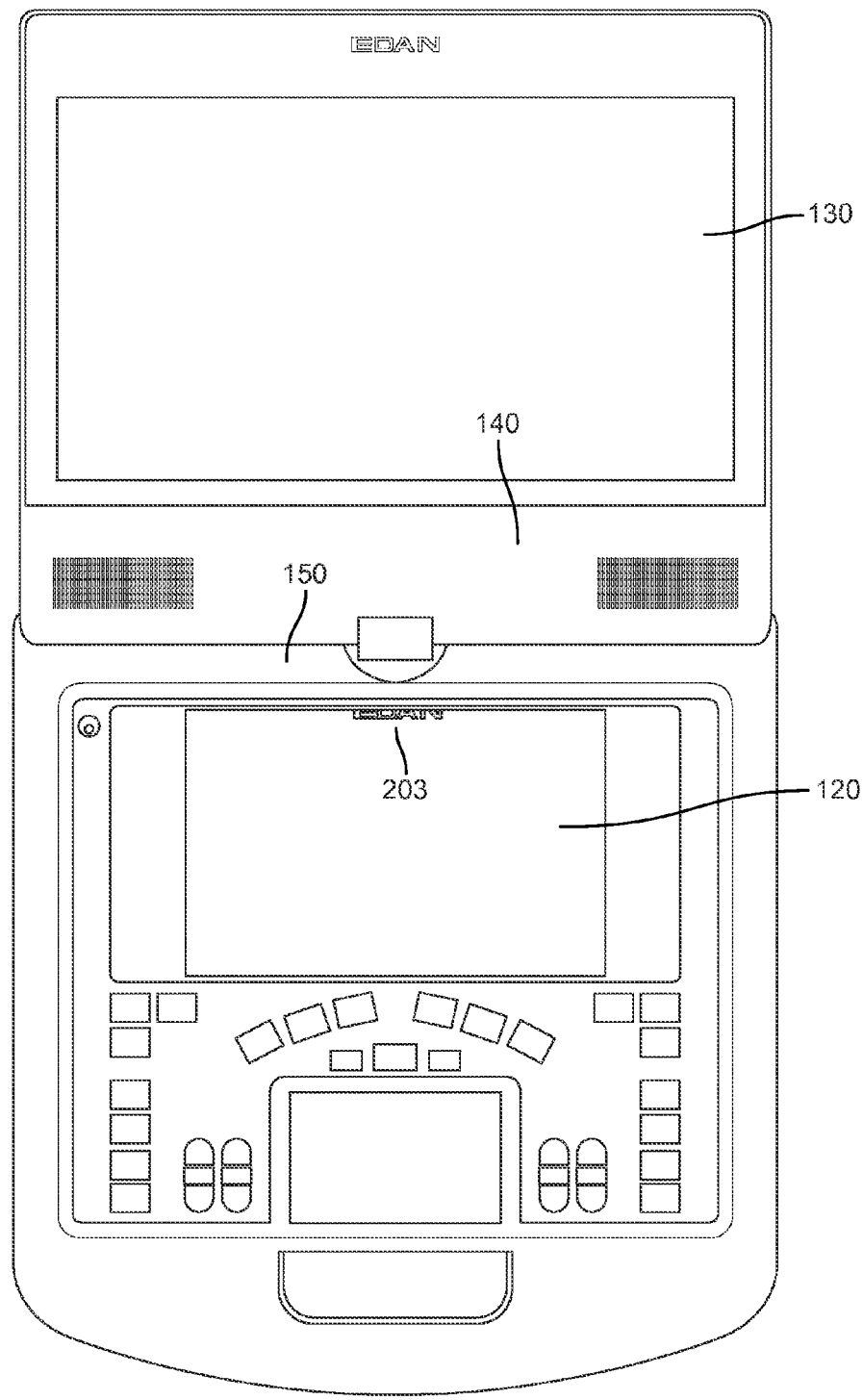
FIG. 11 illustrates an image leaving a second display during a multi-display animation on a multi-display device according to one embodiment of the invention.

FIG. 11 illustrates logo 203 appearing to exit touchscreen 120. Once logo 203 has reached the top edge of touchscreen 120, logo 203 appears to move under main housing 150 and display housing 140. Logo 203 continues to move in direction 205 traveling form the middle of touchscreen 120 to the upper edge of touchscreen 120. Logo 203 appears to continue traveling in direction 205 until the entirety of logo 203 has appeared to travel beneath main housing 150 and display housing 140 while leaving touchscreen 120. In some embodiments, logo 203 exits touchscreen 120 over the course of one second. In alternative embodiments, this time period may be different or vary as previously described above with respect to other time periods.

Figure 12:
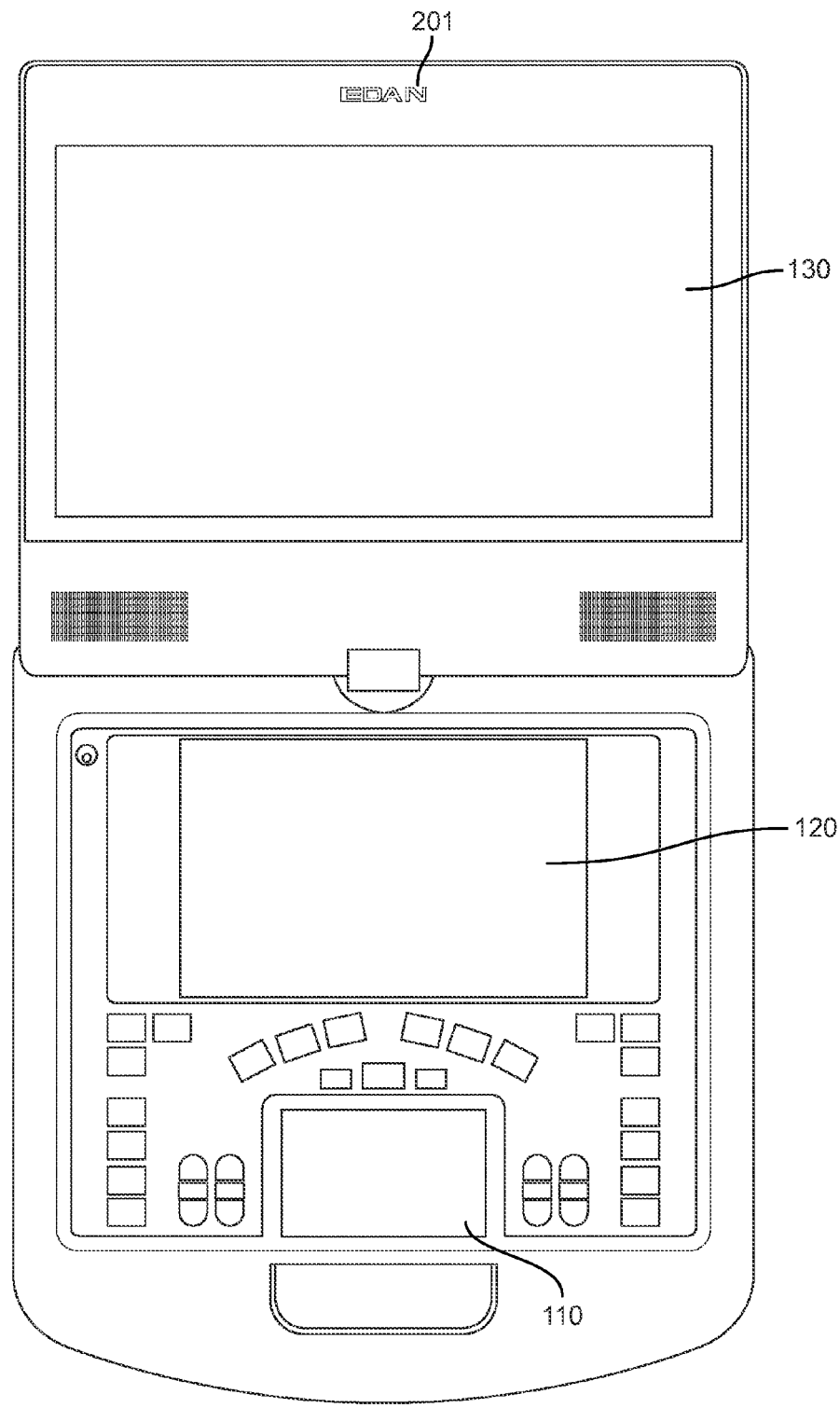
FIG. 12 illustrates an image which has left a second display during a multi-display animation on a multi-display device according to one embodiment of the invention.

FIG. 12 illustrates logo 203 in transition from one display to another. Specifically, logo 203, or any part thereof, is not displayed. Logo 203 appears to be completely obscured behind main housing 150 and display housing 140. In some embodiments, touchscreen 110, touchscreen 120, and main screen 130 do not display an image. After a set amount of time, logo 203 appears to enter main screen 130. In some embodiments, logo 203 may appear to be obscured by main housing 150 and display housing 140 for one second. In alternative embodiments, this time period may be different or vary as previously described above with respect to other time periods.

Figure 13:
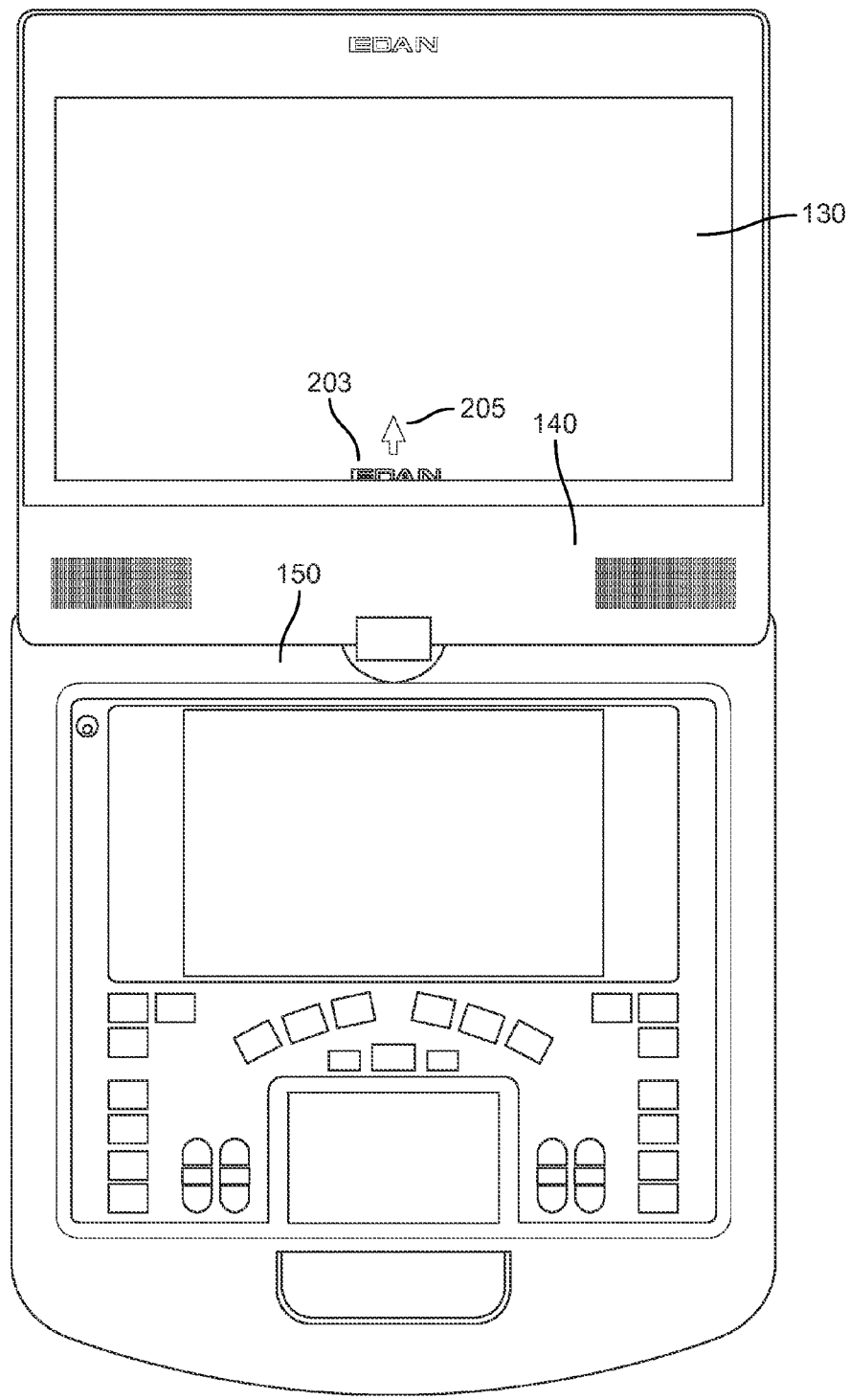
FIG. 13 illustrates an image entering a third display during a multi-display animation on a multi-display device according to one embodiment of the invention.

FIG. 13 illustrates an image appearing on the third display. In some embodiments, logo 203 appears beginning at the bottom of main screen 130. Logo 203 may appear to be entering main screen 130 from beneath main housing 150 and display housing 140 traveling in direction 205. For example, the top of logo 203 may appear on main screen 130 with the rest of logo 203 appearing to be obscured or hidden behind main housing 150 and display housing 140. Logo 203 then appears to scroll up or travel along direction 205. As logo 203 travels, the middle and then entirety of the logo appear to come from beneath main housing 150 and display housing 140 as logo 203 travels towards the middle of main screen 130. In some embodiments, logo 203 enters from beneath main housing 150 and display housing 140 over a time period of one second. In alternative embodiments, this time period may be different or vary as previously described above with respect to other time periods.

In other embodiments, logo 203 may appear to fade in near the bottom of main screen 130. The entirety of logo 203 may be displayed near the bottom of main screen 130 with little brightness and/or intensity. In incremental steps, logo 203 may be displayed with increasing brightness/intensity. These incremental steps may occur with logo 203 fixed near the bottom of main screen 130 until logo 203 is fully displayed. Logo 203 may then appear to travel in direction 205 towards the middle of main screen 130. In other embodiments, logo 203 may increase in brightness/intensity as it travels in direction 205. In further embodiments, logo 203 may increase in brightness/intensity as it appears to enter main screen 130 from beneath main housing 150 and display housing 140. Logo 203 may appear to fade in at the bottom of main screen 130. In some embodiments, logo 203 fades in over a time period of one second. In alternative embodiments, this time period may be different or vary as previously described above with respect to other time periods.

Figure 14:
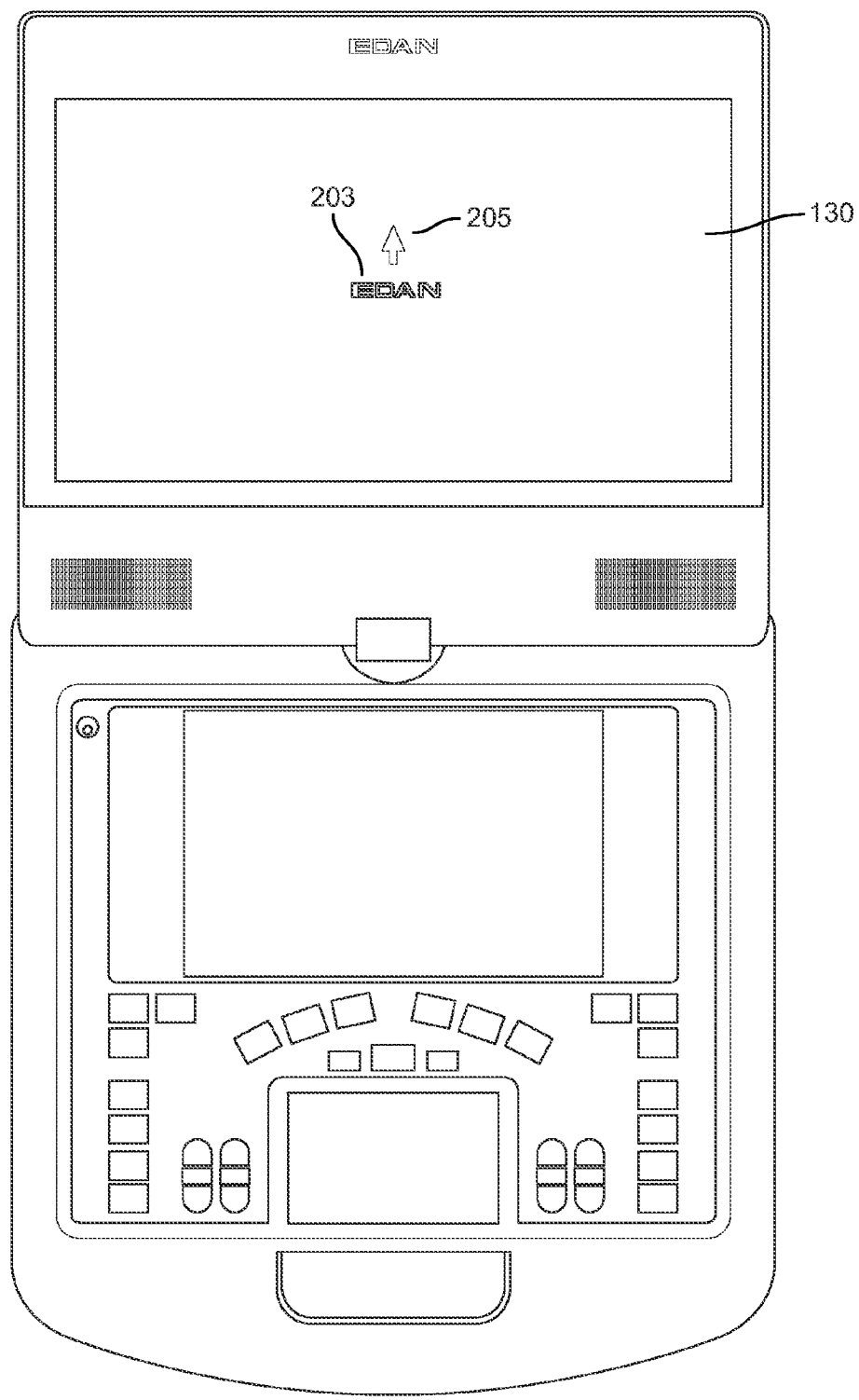
FIG. 14 illustrates an image moving on a third display during a multi-display animation on a multi-display device according to one embodiment of the invention.

FIG. 14 illustrates logo 203 after the entirety of logo 203 has been displayed on main screen 130 and has begun to travel in direction 205. Logo 203 has finished its apparent transition from main housing 150 and display housing 140 or otherwise appeared on main screen 130 and is moving in direction 205. Logo 203 moves in direction 205 through the middle of main screen 130 and towards the top of main screen 130. In some embodiments, logo 203 travels across main screen 130 in direction 205 in one second. In alternative embodiments, this time period may be different or vary as previously described above with respect to other time periods.

Figure 15:
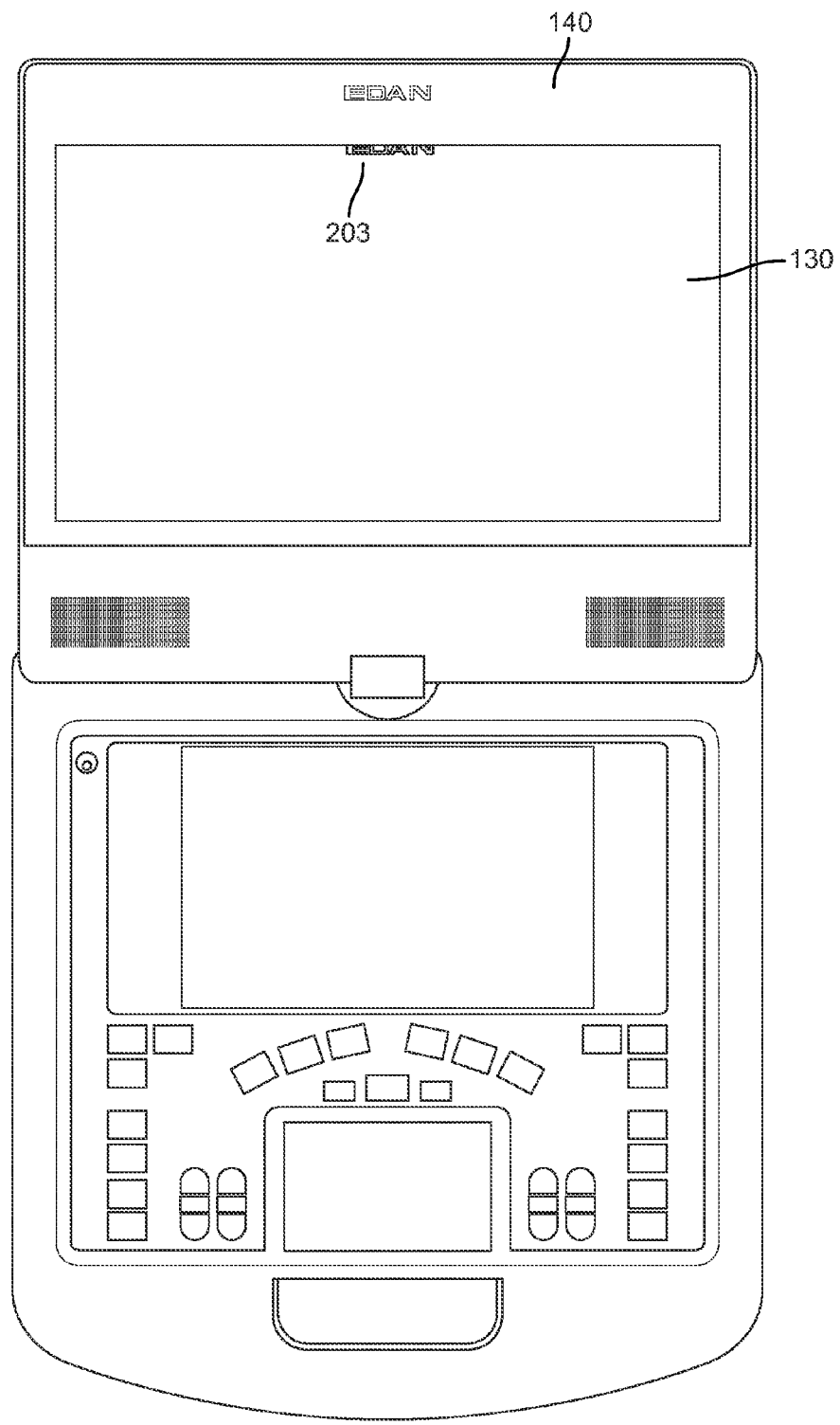
FIG. 15 illustrates an image leaving a third display during a multi-display animation on a multi-display device according to one embodiment of the invention.

FIG. 15 illustrates logo 203 appearing to exit main screen 130. Once logo 203 has reached the top edge of main screen 130, logo 203 appears to move under display housing 140. Logo 203 continues to move in direction 205 traveling from the middle of main screen 130 to the upper edge of main screen 130. Logo 203 appears to continue traveling in direction 205 until the entirety of logo 203 has appeared to travel beneath display housing 140 while leaving main screen 130. In some embodiments, logo 203 exits main screen 130 over the course of one second. In alternative embodiments, this time period may be different or vary as previously described above with respect to other time periods.

Figure 16:
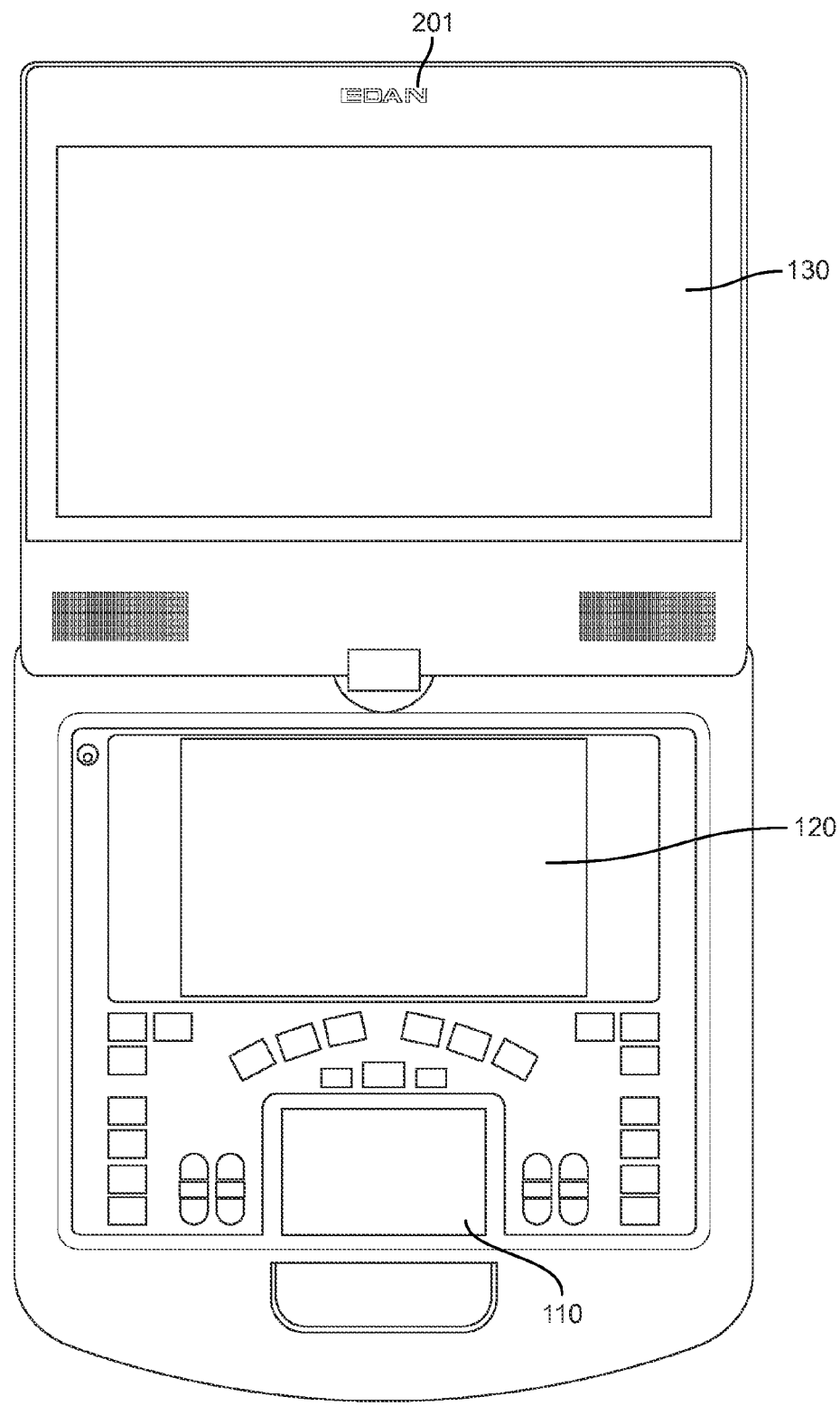
FIG. 16 illustrates an image which has left a third display during a multi-display animation on a multi-display device according to one embodiment of the invention.

FIG. 16 illustrates logo 203 in transition from one display to illuminable hardware other than a display. Specifically, logo 203, or any part thereof, is not displayed. Logo 203 appears to be completely obscured behind display housing 140. In some embodiments, touchscreen 110, touchscreen 120, and main screen 130 do not display an image. In some embodiments, logo 203 may appear to be obscured by keyboard 209 for one second. In alternative embodiments, this time period may be different or vary as previously described above with respect to other time periods.

Figure 17:
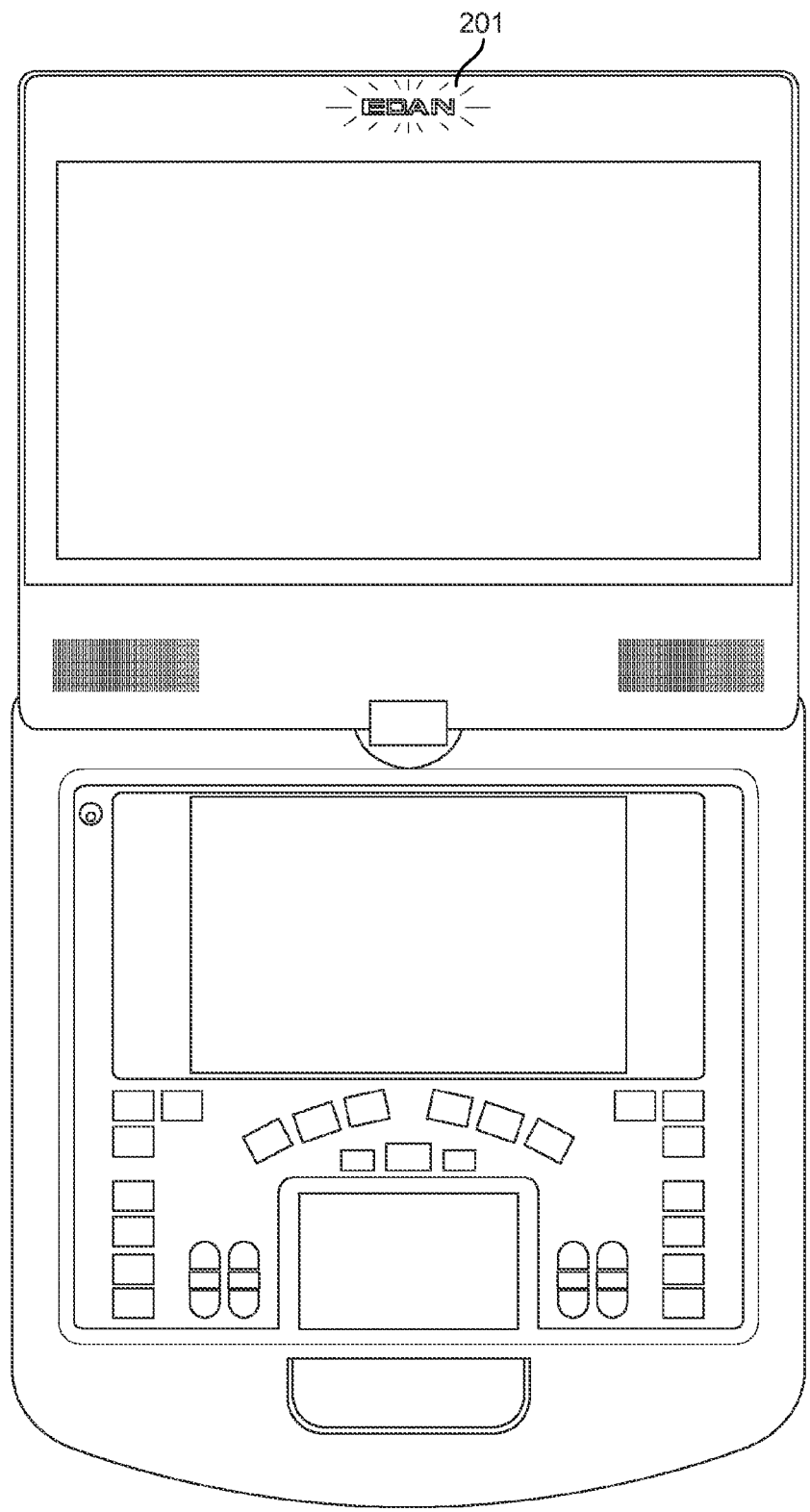
FIG. 17 illustrates a hardware illuminated logo according to one embodiment of the invention.

FIG. 17 illustrates hardware logo 201 illuminated. Following the apparent transition of logo 203 from main screen 130 to beneath display housing 140, hardware logo 201 may be illuminated. In some embodiments, hardware logo 201 is first illuminated (e.g., by a light emitting diode) with low brightness and/or intensity. In incremental steps, hardware logo 201 may be illuminated with increasing brightness/intensity. The brightness/intensity of hardware logo 201 may be increased until a predetermined brightness/intensity is reached. In some embodiments, this value may be customizable by a user through the operating system of portable ultrasound system 100. In some embodiments, hardware logo 201 remains illuminated during operation of portable ultrasound system 100. In other embodiments, hardware logo 201 may cease to be illuminated during certain operations (e.g., performing an ultrasound examination), after a certain length of time following start up, etc. In further embodiments, a user may customize when hardware logo 201 is illuminated and/or for what duration hardware logo 201 is illuminated using the operating system of portable ultrasound system 100. In still further embodiments, hardware logo 201 can dim after having been illuminated for a predetermined amount of time and remain in a dimmed state during operation of portable ultrasound system 100. In some embodiments, the dimming of hardware logo 201 is customizable by a user (e.g., through a user interface or operating system). For example, a user can change the light intensity of hardware logo 201 during the dimmed state, change the length of the time period prior to dimming during which hardware logo 201 is lit with greater intensity.

Figure 18:
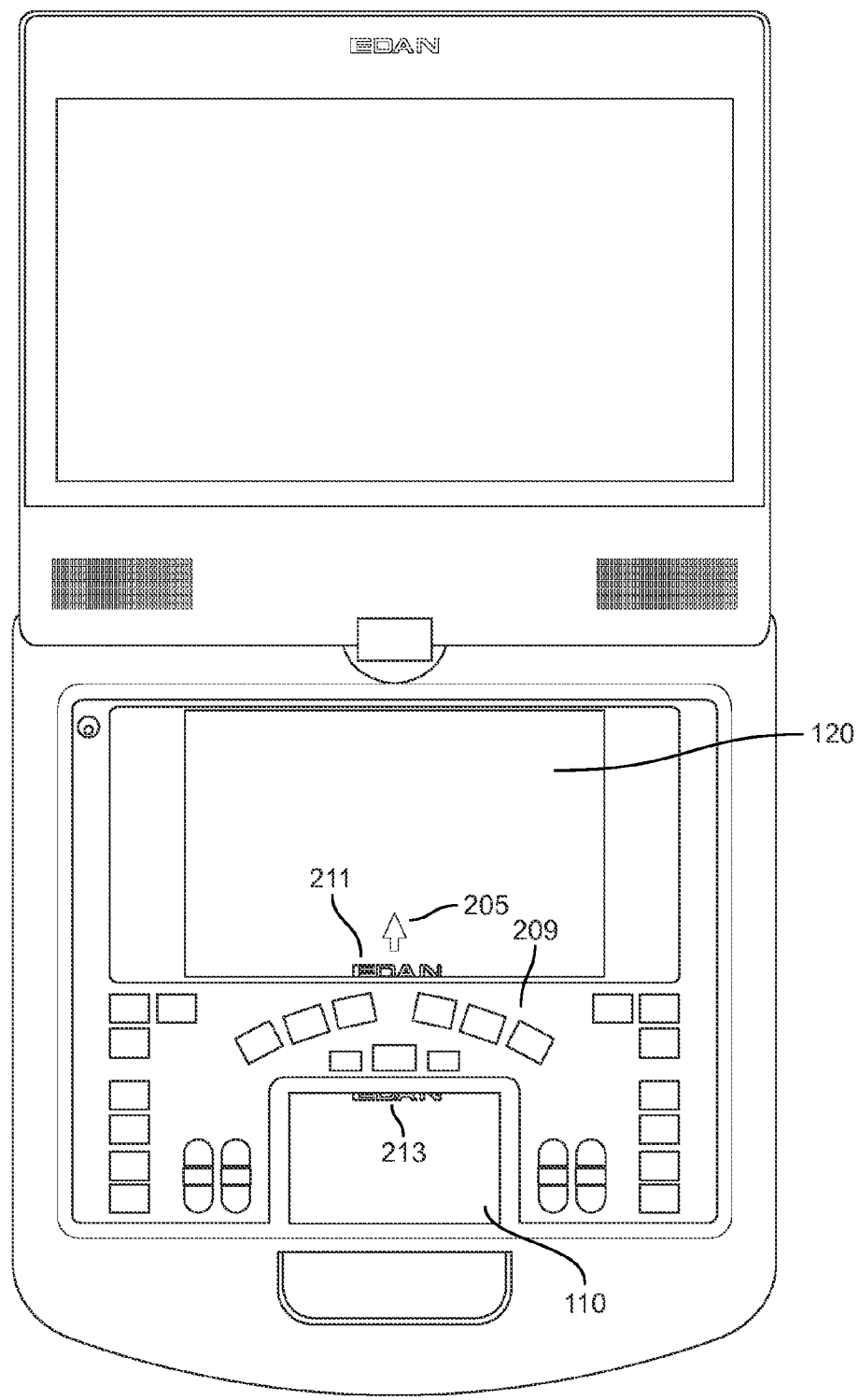
FIG. 18 illustrates an alternative embodiment of an image moving from one display to another display during a multi-display animation.

FIG. 18 illustrates an embodiment of the invention displaying a startup sequence similar to that discussed with reference to FIGS. 4-17 but with different images displayed during the apparent transition of an image from one display to another. When transitioning between displays, an image may appear to travel seamlessly across the displays rather than appear to be hidden behind a portion of the device. For example, while exiting touchscreen 110, a lower portion of the logo 213 may remain displayed on touchscreen 110 while and an upper portion of the logo 211 may be displayed on touchscreen 120. While the logo travels in direction 205 from touchscreen 110 to touchscreen 120, the upper portion of the logo 211 may increase in proportion while the lower portion of the logo 213 decreases in proportion. This may continue until the entirety of the logo is displayed on touchscreen 120. This may give the appearance of the logo moving seamlessly from one display to another. This technique may be applied to one or more display transitions.

In some embodiments of the invention, the display of images or a series of images on a multi-display device is not limited to use with ultrasound devices. According to the techniques discussed herein, images or a series of images may be displayed on multiple displays of any multi-display device. In some embodiments, displays which may be used for displaying images or a series of images include touchscreens, non-touch enabled displays, input devices such as a touchpad, etc. Images may be displayed having a variety of characteristics which differ from the embodiment of the invention illustrated with respect to FIGS. 4-18.

In some embodiments, animations are used which vary from the depicted animation of an image moving vertically from one display to another. For example, images may move horizontally from one display to another, diagonally from one display to another, or move in a combination of various directions from one display to another. In some embodiments, the same animation may take place simultaneously on one or more displays such that each display depicts an identical series of images. In other embodiments, portions of a single image animation may be displayed across a plurality of displays. In further embodiments, a unique image may be displayed on each display such that the images are synchronized. Animations may include various colors and changes in colors. In other embodiments, images may fade in and/or fade out of one or more displays. This may occur as an image is transitioning from one display to another. In other embodiments, images on multiple displays may fade in or out separately from images on other displays.

In some embodiments, animations may be displayed in response to events other than the powering-up of the device on which the animation is displayed. For example, trigger events may include turning off the device, putting the device into a power saving mode, switching from one mode of operation to another, turning off a subset of displays in a multi-display device (e.g., leaving on a main display for viewing information but turning off input displays such as touchscreens and/or touchpads), exiting a power saving mode, etc. In some embodiments, the same animation may be displayed for more than one triggering event. In other embodiments, the animation corresponding to one event may be displayed such that it appears as though the animation occurs in reverse for a different triggering event. For example, the animation associated with powering down may appear to display the animation for powering-up in reverse. In further embodiments, different animations are user for different triggering events.

In some embodiments, displays not in use during a portion of the multi-display animation may remain off. In other embodiments, displays not displaying a colored image may display black across the entirety of the display. In some embodiments, a user may customize the actions taken by displays not in use through the operating system of the device which includes the displays.

Although depicted herein as applying to a multi-display device having three displays, other numbers of displays may be used in conjunction with the techniques described herein. For example, a power-up animation may occur across two displays of a single device. In some embodiments, a multi-display animation of the type described herein may occur on some but not all of the displays of a multi-display device. In other embodiments, the animation may be displayed on a single display that is sectioned. For example, a single display may be sectioned by overlaying a piece of hardware such as a section of housing, strip of material, keyboard, etc. The display may also be sectioned electronically. For example, the display may be configured to divide the display into sections by displaying a divider of a single color.

In some embodiments, the multi-display animation sequence does not end with an additional hardware element. For example, a power-up animation may end by transitioning to a display of an operating system without illuminating hardware logo 201 or any other hardware indicator.

In some embodiments, the multi-display device is one of a portable computing device (e.g., laptop computer or tablet computer), a computer (e.g., desktop computer), a portable phone (e.g., cell phone, satellite phone, smartphone, etc.), or other device which displays information using a plurality of displays.

Referring generally to FIGS. 4-18, a variety of time periods have been previously described herein with reference to specific portions of the animation sequence. The time periods described herein can vary from the examples provided and may be longer or shorter (e.g., multiple seconds or a fraction of a second). Furthermore, each time period described can vary depending on the state of portable ultrasound system 100 or a condition which triggers the animation. For example, time periods during which logo 203 moves as described herein may vary depending on whether portable ultrasound system is being turned on from a powered off state, exiting a sleep mode (e.g., in response to a user input or system event), exiting a hibernation mode (e.g., in response to a user input or system event), and/or other event or trigger. Time periods corresponding to different portions of the animation sequence (e.g., traversing touchscreen 110 and traversing touchscreen 120) can vary. In alternative embodiments, the time periods are the same for one or more portions of the animation sequence.

In some embodiments, the total time during which logo 203 traverses touchscreen 110, touchscreen 120, and main screen 130 is equal to the time during which portable ultrasound system 100 is booting up to a main user interface (e.g., booting the operating system). This time may vary depending on the type of boot. For example, a cold boot (e.g., from a powered off state of portable ultrasound system 100) may result in a longer time period during which logo 203 traverses the screens in the described manner in comparison to a warm boot (e.g., boot from a low power mode, hibernation mode, sleep mode, or other mode of portable ultrasound system 100). In some embodiments, the time during which logo 203 traverses touchscreen 110, touchscreen 120, and main screen 130 is equal to the time during which portable ultrasound system 100 completes a booting process (or any other process such as a process triggered by a user, a trigger condition as described herein, etc.), thus indicating to a user that the booting process is complete. For example, processing circuit 163 may be configured to store a boot load time and control the rate at which logo 203 traverses touchscreen, 110, touchscreen 120, and display 130 based on the boot load time. Processing circuit 163 may be configured to update the stored boot load time if a measured boot load time changes. Processing circuit 163 may be configured to track stages of a booting process, and control the rate at which logo 203 traverses touchscreen 110, touchscreen 120, and main screen 130 based on the stages of the booting process. For example, the booting process may be organized into stages corresponding to a first third, a second third, and a third third of the booting process, and logo 203 may be displayed on touchscreen 110 during the first third of the booting process, on touchscreen 120 during the second third of the booting process, and on main screen 130 during the third third of the booting process. In various such embodiments, less than all three of touchscreen 110, touchscreen 120, and main screen 130 may be used to indicate completion of the booting process. In various embodiments, hardware logo 201 may also be used to indicate completion of the booting process, either alone or in conjunction with at least one of touchscreen 110, touchscreen 120, and main screen 130. In various embodiments, logo 203 may increase in brightness/intensity to correspond to completion of stages of the booting process and/or to indicate completion of the booting process.

Figure 19A:
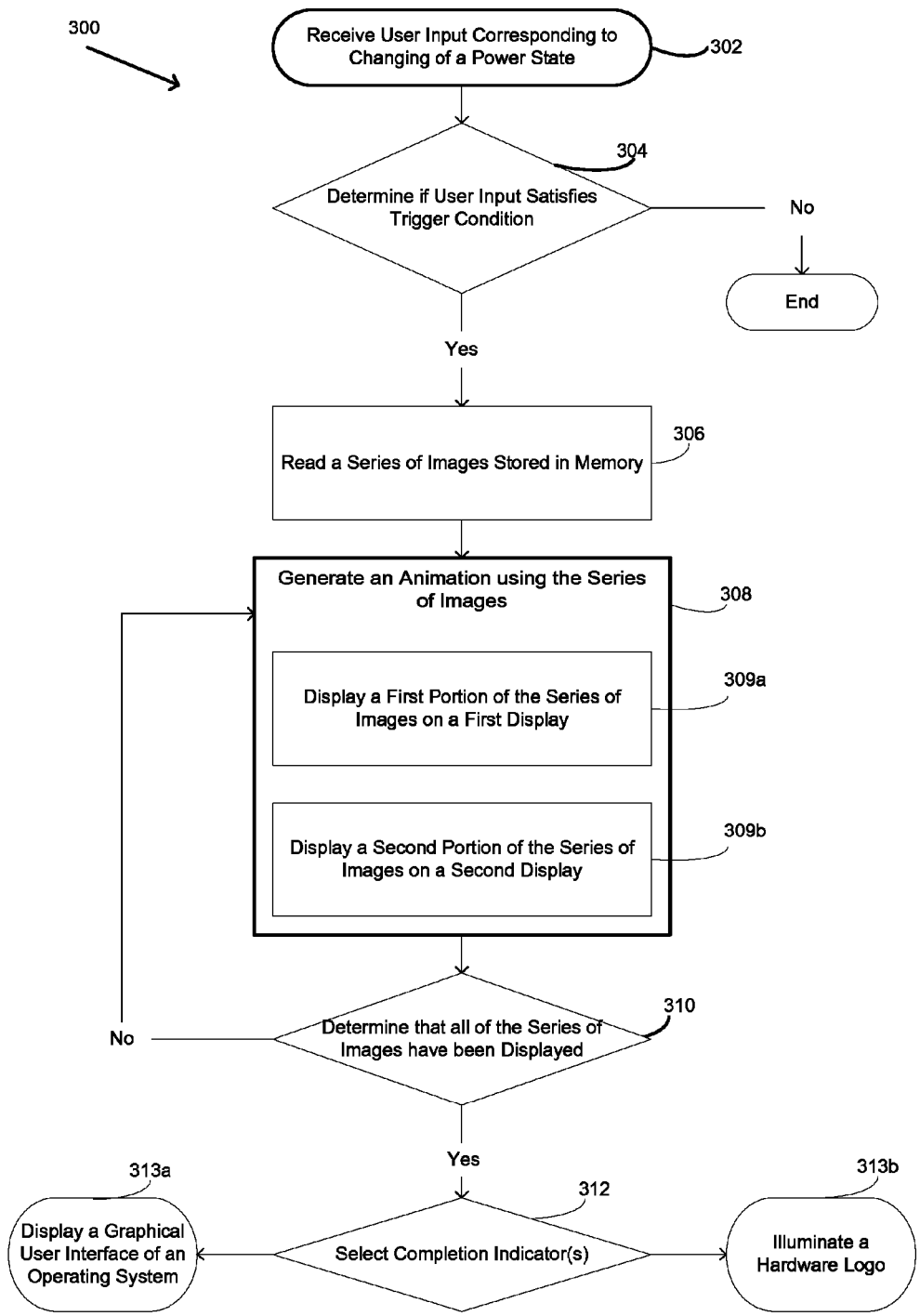
FIG. 19A illustrates a method of displaying a multi-display animation on a multi-display device according to one embodiment of the invention.

FIG. 19A illustrates method 300 for generating and displaying an animation of a series of images on a portable computing device having multiple displays (e.g., displaying logo 203 on portable ultrasound device 100 having touchscreen 110, touchscreen 120, main screen 130, and hardware logo 201). At 302, a user input corresponding to a changing of a power state is received. The user input may be received using user input interface 173.

At 304, a determination is made as to whether the user input satisfies a trigger condition. Processing circuit 163 may be configured to determine whether the user input satisfies a trigger condition. The trigger condition may be at least one of powering on portable ultrasound device 100, portable ultrasound device 100 exiting a standby mode, portable ultrasound device 100 exiting a sleep mode, portable ultrasound device 100 exiting a hibernation mode, portable ultrasound device 100 exiting a lower power mode, or a lid of portable ultrasound device 100 being opened.

In response to the user input satisfying the trigger condition, at 306, a series of images stored in memory are read. For example, the series of images may be stored in memory 165 or hard disk storage 169, may be read by processing circuit 163, and may correspond to logo 203.

At 308, an animation is generated using the series of images. Generating the animation may include at 309a, displaying a first portion of the series of images on a first display (e.g., touchscreen 110), and at 309b, displaying a second portion of the series of images on a second display (e.g., touchscreen 120). In various embodiments, various combinations of touchscreen 110, touchscreen 120, main screen 130, and/or hardware logo 201 may be used to display the series of images.

Processing circuit 163 may control operation of display interfaces 171 and/or touchscreens 110, 120, to determine how the animation is generated, according to any of the animation and display processes disclosed herein. In some embodiments, the images are not displayed on both the first display and the second display simultaneously. The images may be displayed having motion, such as by travelling upwards through the first display and then upwards through the second display. In some embodiments, the series of images include logo 203 at ascending locations on touchscreen 110 and touchscreen 120 such that displaying the series of images generates an animation in which logo 203 travels upward across touchscreen 110 and touchscreen 120.

In some embodiments, a third portion of the series of images is displayed simultaneously on the first display and the second display prior to displaying the second portion of the series of images on the second display. In some embodiments, a third portion of the series of images is displayed on a third display (e.g., main screen 130) prior to displaying images on touchscreen 110 and touch screen 120. In some embodiments, a third portion of the series of images is displayed on touchpad 110 prior to displaying images on touchscreen 120 and main screen 130.

In some embodiments, the series of images includes images in which only an upper portion of logo 203 is displayed, and includes images in which only a lower portion of logo 203 is displayed, such that displaying the series of images generates an animation in which logo 203 appears part by part from a bottom of touchscreen 110, travels upward across touchscreen 110, disappears part by part from a top of touchscreen 110, appears part by part from a bottom of touchscreen 120, and disappears part by part from a top of touchscreen 120.

At 310, a determination is made whether all of the series of images have been displayed. For example, processing circuit 163 may be configured to track the animation of the series of images, such as by tagging the images with an order and identifying when a final image has been displayed. In response to a determination that all of the series of images have not been displayed, processing circuit 163 may further control operation of display interfaces 171 and/or touchscreen 110, touchscreen 120, main screen 130, and hardware logo 201 to continue performing step 308 for generating the animation until all of the series of images have been displayed.

In response to a determination that all of the series of images have been displayed, at 312, an indication of the completion of the animation is selected. For example, at 313a, a graphical user interface of an operating system may be displayed. At 313b, hardware logo 201 may be illuminated, such as by controlling a light source of portable ultrasound device 100 using processing circuit 163. In some embodiments, one, both, or neither of the completion indicators 313a and 313b may be performed. In some embodiments, a graphical user interface of an operating system is automatically displayed in response to the determination that all of the series of images have been displayed.

Figure 19B:
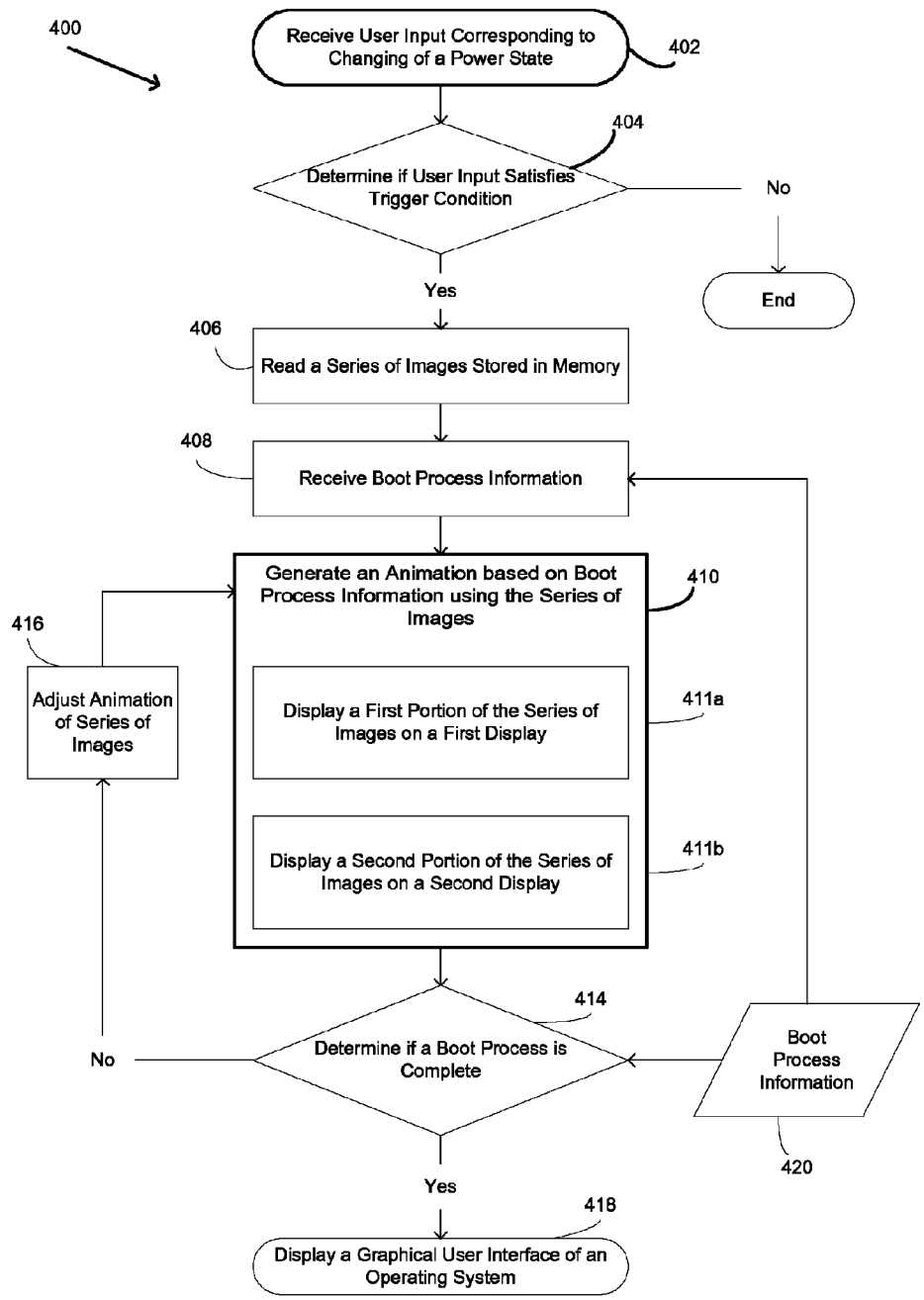
FIG. 19B illustrates a method of displaying a multi-display animation on a multi-display device in synchronization with a boot process according to one embodiment of the invention.

FIG. 19B illustrates method 400 for generating and displaying an animation of a series of images. Method 400 is similar to method 300, with additional steps relating to synchronization with a boot process as described herein. At 402, user input is received corresponding to changing of a power state. At 404, a determination is made as to whether the user input satisfies a trigger condition. In response to the user input satisfying the trigger condition, at 406, a series of images stored in memory is read.

At 408, boot process information is received. For example, processing circuit 163 may receive boot process information from memory 165 and/or hard disk storage 169. Boot process information may include an expected duration for the boot process, a measured duration for the boot process, an indication of a stage of the boot process, and indication of a rate of completion of the boot process, an indication of an expected completion time for the boot process, an indication of a data processing rate required for the boot process, etc.

At 410, an animation is generated based on the boot process information using the series of images. At 411a, a first portion of the series of images is displayed on a first display. At 411b, a second portion of the series of images is displayed on a second display.

At 414, a determination is made as to whether the boot process is complete. Additional/and or updated boot process information may be received to perform the determination. For example, processing circuit 163 may compare a current time to an expected completion time for the boot process. Processing circuit 163 may identify a current stage of the boot process to determine if the boot process is complete. Processing circuit 163 may compare a measured boot process duration to an expected duration for completing the boot process.

In response to a determination that the boot process is not complete, at 416, the animation of the series of images may be continued or adjusted. For example, if the boot process is not complete based on a current time being prior to an expected completion time, the animation may be continued. If the boot process is not complete based on a current stage of the boot process not being the final stage of the boot process, the animation may be continued and/or a rate of animation may be adjusted to synchronize the animation with the boot process.

In response to a determination that the boot process is complete, at 418, a graphical user interface of an operating system is displayed. In some embodiments (not shown), a specific completion indicator may also be displayed, such as illuminating hardware logo 201 at a specific brightness/intensity, accelerating the animation to a completion point, and/or displaying logo 203 at a specific brightness/intensity.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable computing device, comprising:
a user interface system including a main housing including a first display and a display housing including a second display, the display housing permanently attached to the main housing;
a memory storing a series of images;
a user input device configured to receive an input from a user corresponding to changing a power state of the portable computing device; and
a processing circuit coupled to the user interface system, the memory, and the user input device;
wherein the processing circuit is configured to receive the input from the user corresponding to changing the power state, determine based on the received input if the input satisfies a trigger condition, and in response to determining that the trigger condition is satisfied, display the series of images on the first display and the second display such that at least one image is displayed on the first display and the second display during a display sequence.

2. The portable computing device of claim 1, wherein the display sequence includes displaying a portion of the series of images first on the first display and then displaying a second portion of the series of images on the second display, and wherein images are not displayed on both the first display and the second display simultaneously.

3. The portable computing device of claim 1, wherein the display sequence includes displaying a portion of the series of images first on the first display, then displaying a second portion of the series of images simultaneously on the first display and the second display, and then displaying a third portion of the series of images on the second display.

4. The portable computing device of claim 1, wherein the series of images include a logo at ascending locations on the first display and the second display such that displaying the series of images generates an animation in which the logo travels upward across the first display and the second display.

5. The portable computing device of claim 4, wherein the series of images includes images in which only an upper portion of the logo is displayed and includes images in which only a lower portion of the logo is displayed, such that displaying the series of images generates an animation in which the logo appears part by part from a bottom of the first display, travels upward across the first display, disappears part by part from a top of the first display, appears part by part from a bottom of the second display, and disappears part by part from a top of the second display.

6. The portable computing device of claim 1, wherein the trigger condition is at least one of powering on the portable computing device, the portable computing device exiting a standby mode, the portable computing device exiting a sleep mode, the portable computing device exiting a hibernation mode, the portable ultrasound device exiting a low power mode, or a lid of the portable ultrasound device being opened.

7. The portable computing device of claim 1, further comprising a hardware logo and a light source positioned to illuminate the hardware logo, wherein the processing circuit is configured to illuminate the hardware logo by controlling the light source in response to determining that the display sequence has ended.

8. The portable computing device of claim 1, wherein the processing circuit is further configured to display a graphical user interface of an operating system in response to determining that the display sequence has ended.

9. The portable computing device of claim 1, further comprising a third display, wherein the first display is a main screen, the second display is a touchscreen display, and the third display is a touchpad, and wherein the processing circuit is configured to display the series of images on the first display, the second display, and the third display, such that at least one image is displayed on the first display, the second display, and the third display during a display sequence.

10. The portable computing device of claim 1, wherein the display of images on the first display and the second display indicates to the user that the displays are functioning.

11. A method of displaying a sequence of images on a portable computing device, comprising:
receiving at a user input device an input from a user corresponding to changing a power state of the portable computing device;
receiving at a processing circuit the input from the user input device;
determining, using the processing circuit, if the received input satisfies a trigger condition; and
in response to determining that the trigger condition is satisfied and using the processing circuit:
reading from memory, a series of images stored in the memory;
displaying a first portion of the series of images first on a first display of a main housing of the portable computing device; and
then displaying a second portion of the series of images on a second display of a display housing of the portable computing device, the display housing attached to the main housing.

12. The method of claim 11, wherein images are not displayed on both the first display and the second display simultaneously.

13. The method of claim 11, further comprising displaying a third portion of the series of images simultaneously on the first display and the second display prior to displaying the second portion of the series of images on the second display.

14. The method of claim 11, wherein the series of images include a logo at ascending locations on the first display and the second display such that displaying the series of images generates an animation in which the logo travels upward across the first display and the second display.

15. The method of claim 11, wherein the series of images includes images in which only an upper portion of the logo is displayed and includes images in which only a lower portion of the logo is displayed, such that displaying the series of images generates an animation in which the logo appears part by part from a bottom of the first display, travels upward across the first display, disappears part by part from a top of the first display, appears part by part from a bottom of the second display, and disappears part by part from a top of the second display.

16. The method of claim 11, wherein the trigger condition is at least one of powering on the portable computing device, the portable computing device exiting a standby mode, the portable computing device exiting a sleep mode, the portable computing device exiting a hibernation mode, the portable computing device exiting a low power mode, or a lid of the portable computing device being opened.

17. The method of claim 11, further comprising:
determining that all of the series of images have been displayed; and
controlling a light source of the portable computing device using the processing circuit to illuminate a hardware logo included on the portable computing device in response to determining that all of the series of images have been displayed.

18. The method of claim 11, further comprising:
determining that all of the series of images have been displayed; and
displaying a graphical user interface of an operating system in response to determining that all of the series of images have been displayed.

19. The method of claim 11, displaying a third portion of the series of images on a third display prior to displaying images on the first and second displays, wherein the first display is a main screen, the second display is a touchscreen display, and the third display is a touchpad.

20. The method of claim 11, wherein displaying the images on the first display and the second display indicates to the user that the displays are functioning.

* * * * *